(12) United States Patent
Subramanian et al.

(10) Patent No.: US 7,843,830 B1
(45) Date of Patent: Nov. 30, 2010

(54) RESILIENT RETRANSMISSION OF EPOCH DATA

(75) Inventors: Krishnamurthy Subramanian, Mountain View, CA (US); Heeloo Chung, San Francisco, CA (US); Glenn Poole, Fremont, CA (US)

(73) Assignee: Force 10 Networks, Inc, San Jose, CA (US)

( * ) Notice: Subject to any disclaimer, the term of this patent is extended or adjusted under 35 U.S.C. 154(b) by 1600 days.

(21) Appl. No.: 11/122,603

(22) Filed: May 5, 2005

(51) Int. Cl.
*H04J 3/14* (2006.01)
*H04J 1/16* (2006.01)
*H04L 1/00* (2006.01)
*H04L 12/26* (2006.01)
*G08C 15/00* (2006.01)
*G06F 11/00* (2006.01)
*G01R 31/08* (2006.01)

(52) U.S. Cl. .................. 370/235; 370/229; 714/776

(58) Field of Classification Search ......... 370/412–418, 370/428–429, 235, 236, 236.1, 236.2, 387–388, 370/359, 419; 714/776
See application file for complete search history.

(56) References Cited

U.S. PATENT DOCUMENTS

| | | | | |
|---|---|---|---|---|
| 5,802,077 A | * | 9/1998 | Yeh | 714/797 |
| 6,897,788 B2 | * | 5/2005 | Khair et al. | 340/870.16 |
| 2003/0065933 A1 | * | 4/2003 | Hashimoto et al. | 713/194 |
| 2004/0013121 A1 | * | 1/2004 | Higashigawa et al. | 370/400 |
| 2004/0042448 A1 | * | 3/2004 | Lebizay et al. | 370/362 |
| 2005/0172163 A1 | * | 8/2005 | Borianne | 714/6 |
| 2005/0213668 A1 | * | 9/2005 | Iwabuchi et al. | 375/240.27 |
| 2006/0107188 A1 | * | 5/2006 | Koyanagi et al. | 714/776 |
| 2006/0153232 A1 | * | 7/2006 | Shvodian | 370/468 |
| 2006/0165002 A1 | * | 7/2006 | Hicks et al. | 370/248 |

\* cited by examiner

*Primary Examiner*—Brian D Nguyen
*Assistant Examiner*—Kyle C Kasparek
(74) *Attorney, Agent, or Firm*—Robert Schuler

(57) ABSTRACT

Apparatus and methods for epoch retransmission in a packet network device are described. In at least one embodiment, epoch receivers check received epoch data for errors. When an error is detected, a receiver is allowed to request that the entire epoch be retransmitted. All epoch senders retain transmitted epoch data until the time for requesting a retransmission of that data is past. If retransmission is requested by any receiver, the epoch is "replayed." This approach mitigates the problem of dropping multiple packets (bundled in a large epoch) due to an intraswitch error with the epoch. Other embodiments are also described and claimed.

23 Claims, 21 Drawing Sheets

Fig. 11A
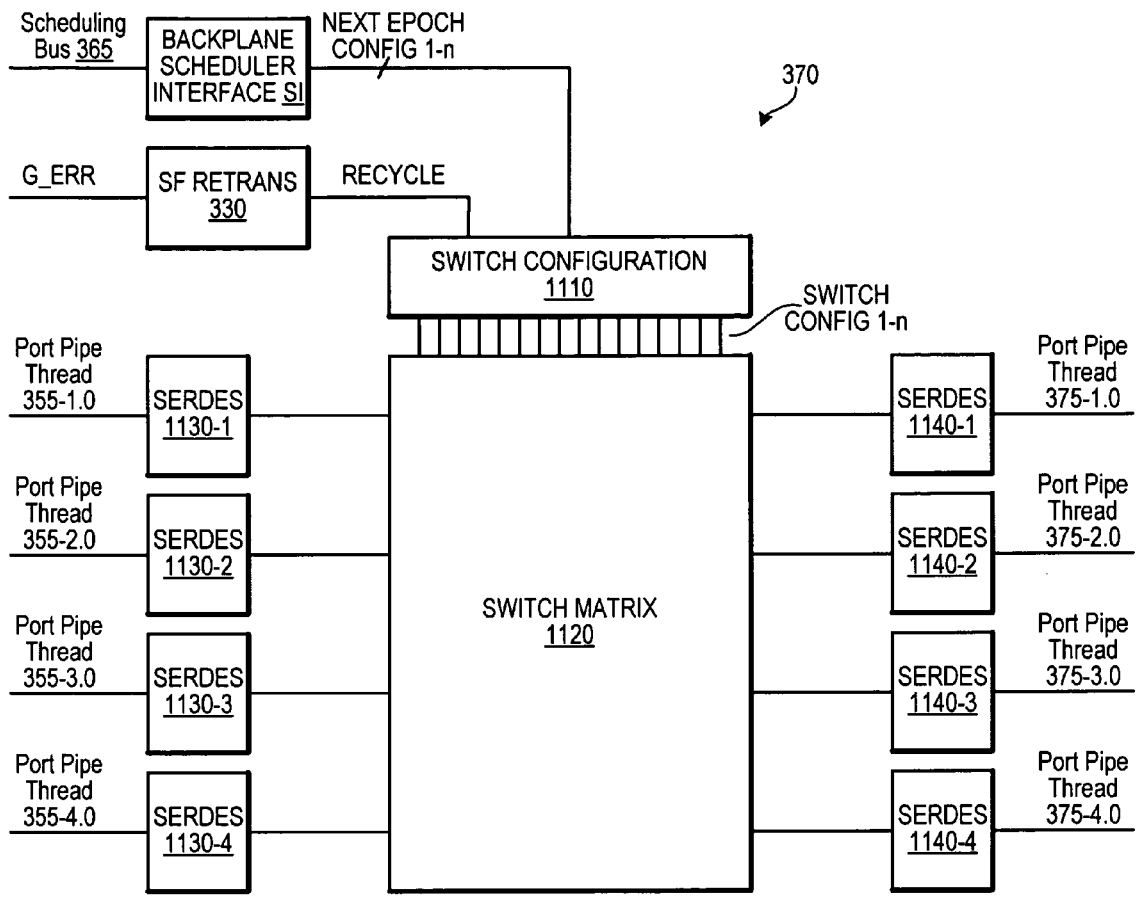
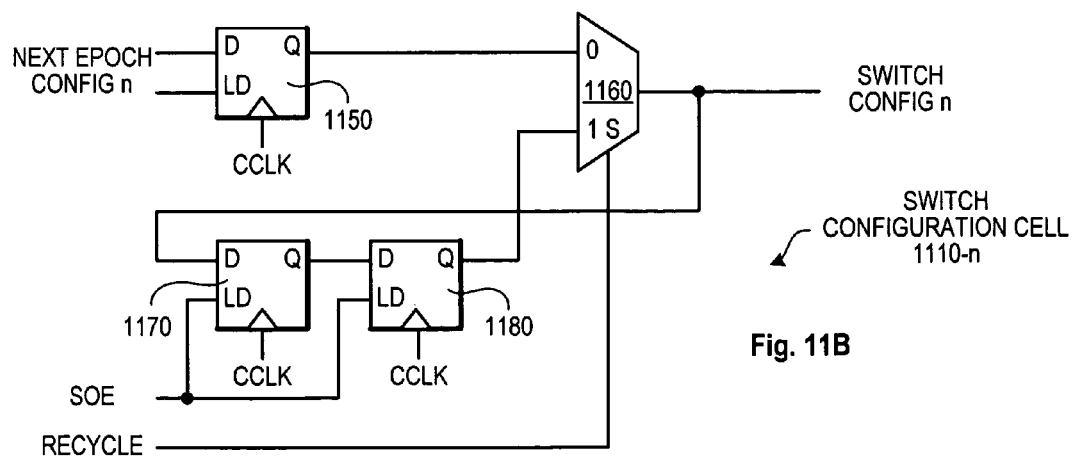
Fig. 11B

RESILIENT RETRANSMISSION OF EPOCH DATA

BACKGROUND

1. Field of the Invention

The present disclosure relates generally to packet network devices, and more particularly to methods and apparatus for retransmitting an epoch of data within such a device.

2. Description of Related Art

FIG. 1 shows one configuration for a distributed packet switching/routing platform 100, e.g., capable of operating as a packet switch in a packet network. Line cards LC1, LC2, LC3, and LC4 receive packet/frame data on ingress ports In1 and In2 and transmit packet/frame data on egress ports Eg3 and Eg4 (although typically each line card will have both ingress and egress ports, to simplify FIG. 1 only LC1 and LC2 are shown with ingress ports and only LC3 and LC4 are shown with egress ports). A switch fabric 70 connects to each line card to facilitate movement of packet data between the ingress and egress ports. As typically several line cards may receive ingress packets destined for the same egress line card and each line card may receive ingress packets destined for multiple egress line cards, a scheduler 60 determines a time-varying switch fabric configuration that attempts to treat all line cards fairly in distributing ingress packets to egress line cards.

Regarding line card LC1, several ingress-related blocks are depicted. PHY 20-1 receives electrical or optical signals at one or more ingress ports In1, and translates these signals to a frame bitstream/bitstreams. Ingress processing 30-1 receives the bitstream/bitstreams, detects frames/packets in the data, determines an egress line card that should receive each packet to move it toward its destination, and updates packet headers as necessary for each packet. Each packet is tagged with an internal tag that indicates the egress line card, packet priority, etc., and is then passed to ingress traffic manager (ITM) 40-1.

ITM 40-1 stores each tagged ingress packet in an ingress buffer/queue memory 50-1 until scheduler 60 grants a time slot for the packet to be transmitted across switch fabric 70. Within memory 50-1, the packets are sorted into queues based on destination line card, and possibly also based on other attributes such as a Quality of Service (QoS) attribute for the packet. ITM 40-1 communicates with scheduler 60 over scheduling bus 65 to report which queues have traffic waiting and how much traffic is waiting.

Within line card LC2, a PHY 20-2, ingress processing 30-2, an ITM 40-2, and an ingress buffer/queue memory 50-2 will be processing packets concurrently, in similar fashion as their counterparts on line card LC1, but for ingress ports In2.

Scheduler 60 divides time into epochs. Each epoch is a time slice during which switch fabric 70 will maintain a given configuration dictated by scheduler 60, and each epoch in this example is long enough to allow transmission of multiple 1500-byte packets (or even more smaller packets) from an ITM. The switch fabric configuration for an upcoming epoch is communicated to each ingress traffic manager. Assume, e.g., that for the upcoming epoch, ingress traffic manager 40-1 will be allowed to transmit packets to an egress traffic manager 80-3 on line card LC3. In this case, ingress traffic manager 40-1 will prepare to send packets from one or more LC3-bound queues to switch fabric 70 on a port pipe 55-1 when the epoch actually begins. Epoch traffic manager 40-2 will concurrently prepare to send packets during the upcoming epoch to a different line card (e.g., LC4) per the configuration granted by scheduler 60.

Switch fabric 70 switches packets from its ingress port pipes (port pipes 55-1 and 55-2 are shown) to its egress port pipes (port pipes 75-3 and 75-4 are shown). For each epoch, scheduler 60 instructs switch fabric 70 as to which egress port pipe(s), if any, should be connected to each ingress port pipe. Switch fabric 70 sets the necessary switching configuration to support data transfer between the ingress and egress port pipes during the epoch.

Line cards LC3 and LC4 are shown with analogous elements to the ingress elements of line cards LC1 and LC2. Line card LC3 contains an egress traffic manager (ETM) 80-3 that receives epoch data from port pipe 75-3 and stores the epoch data in an egress buffer/queue memory 90-3. ETM 80-3 sends packets from memory 90-3 to egress processing 95-3, which readies the packets/frames for transmission and forwards them to the appropriate channel on PHY 20-3. PHY 20-3 converts the packets/frames to the optical or electrical format for the transmission medium used on egress ports Eg3. Line card LC4 performs analogous functions with an ETM 80-4, an egress buffer/queue memory 90-4, egress processing 95-4, and PHY 20-4, for egress port pipe 75-4 and egress ports Eg4.

Each traffic manager interfaces with its port pipe through a port pipe FIFO (First-In First-Out), which is a circular buffer capable of holding about 1.2 epochs of data. ITM 40-1 fills a port pipe FIFO 45-1 with packet data stored in an appropriate queue in memory 50-1, based on a first pointer into the circular buffer. Concurrently, a second pointer synchronized to the start of each epoch empties data for the current epoch from the FIFO to port pipe 55-1. ETM 80-3 empties a port pipe FIFO 85-3 to its buffer memory 90-3 based on a first pointer into that circular buffer. Concurrently, a second pointer synchronized to the start of each epoch fills the FIFO with epoch data for the current epoch from port pipe 75-3.

Several timed events determine what queue is used to fill an ingress port pipe FIFO, and when each FIFO will be filled and emptied. FIG. 2 presents a timing example that further illustrates the epoch timing for transmission of packets between an ingress traffic manager and an egress traffic manager. Each epoch occupies a fixed time segment of period $T_E$. Four full epochs 1-4 and parts of epochs 0 and 5 are illustrated.

The first event shown in FIG. 2 occurs during epoch 0. Towards the end of epoch 0, scheduler 60 transmits a GRANT to ITMs 40-1 and 40-2. The GRANT instructs each ITM as to which egress line card it will be paired with for an upcoming epoch. The GRANT is received just over an epoch prior to when data corresponding to the GRANT will begin emptying from the ingress port pipe FIFOs 45-1 and 45-2. For instance, the GRANT B received near the end of epoch 0 in FIG. 2 pertains to GRANT B data that will be transmitted through the switch fabric during epoch 2.

After receiving GRANT B, ITM 40-1 begins filling port pipe FIFO 45-1 with data B1 for GRANT B (although the figures show the fill operation beginning at the next start-of-epoch, in practice the fill operation can begin when the grant is received). In FIG. 2, the contents of FIFO 45-1 are represented as a buffer map as a function of time, with the top of the FIFO 45-1 time history representing a physical buffer location at one "end" of the buffer and the bottom of the FIFO 45-1 time history representing a physical buffer location at the other "end" of the buffer. The FIFO is filled starting from a buffer position just after the end of the FIFO data A1 for a preceding GRANT A, with the slanted left edge of region B1 representing the filling operation. Note that as data B1 for GRANT B begins to fill FIFO 45-1, a Start Of Epoch (SOE) signal is received for epoch 1, signaling that it is time to begin emptying data A1 for GRANT A from FIFO 45-1. As GRANT A data is read out of FIFO 45-1, GRANT B data overwrites most of the space just occupied by GRANT A data. The GRANT A data has, however, been placed on port pipe 55-1 for transmission to LC3, and is no longer needed by ITM 40-1.

During epochs 1 and 3, switch fabric 70 is passing data from ingress port pipe 55-1 to egress port pipe 75-3, and from ingress port pipe 55-2 to egress port pipe 75-4. During epochs 2 and 4, this ingress-to-egress pairing is reversed The same data appears on the paired ingress and egress port pipes during an epoch, with the egress port pipe data slightly delayed due to switch fabric handling delay. GRANT A data appears on the port pipes during epoch 1, GRANT B data appears on the port pipes during epoch 2, and so on.

Egress port pipe FIFOs 85-3 and 85-4 operate similar to ingress port pipes 45-1 and 45-2, except they are filled from their port pipe and emptied by their ETM to the egress buffer memory. Because of the alternating switch fabric configuration used in this example, each egress port pipe receives data from one ingress card during even epochs and from the other ingress card during odd epochs.

Each epoch of data is finally completely resident in its destination egress buffer about three epochs after the grant for that epoch of data. It can be seen that this scheduler grant sequence could be modified should one ingress card receive data weighted more towards one egress card than the other. In a system with more than two ingress port pipes and two egress port pipes, scheduling will result in many more permutations for grants as a function of time, but the preceding example illustrates the essential functionality that is scaled for a larger number of port pipes.

SUMMARY OF THE INVENTION

The epoch method described in the background is particularly attractive for high-throughput, high-port-count packet switches. As a practical matter, scheduling/switching of individual packets between a combinatorially significant number of ingress and egress ports becomes intractable at some switch size and speed. In such high-performance switches, the statistical nature of the switching problem allows epoch-based scheduling to effectively schedule groups of packets with similar attributes through the switch fabric instead of single packets.

It has now been realized that one drawback of epoch-based scheduling is that the potential exists for a single internal bit-transmission error to cause many packets (from the same epoch and ingress unit) to be discarded. As port pipe speed increases, allowing ever-larger epoch data lengths, the cost of each transmission error can become more significant. At the same time, imposing a requirement that each internal transmission link function to perfection, even as link speed increases, may not be cost effective.

The described epoch-scheduled embodiments are designed to decrease packet drop frequency due to internal bit transmission errors, and consequently make a switch more tolerant of, e.g., backplane errors. Each ingress unit operating according to one of these embodiments guarantees that epoch data remains valid beyond the epoch in which the data is transmitted out a port pipe. Each egress unit operating according to one of these embodiments checks the data integrity for incoming epoch data, and generates an error signal when an epoch's data is received with an error. When an error signal is generated, the ingress unit that sent the data that was corrupted is expected to retransmit the epoch data to the egress unit. If no error signal is generated, the ingress unit is allowed to discard the temporarily held epoch data. Various methods and apparatus for accomplishing these functions are described.

BRIEF DESCRIPTION OF THE DRAWINGS

The present invention can be best understood by reading the specification with reference to the following Figures, in which:

FIGS. 11A and 11B illustrate switch fabric details for a switch fabric useful with some embodiments of the FIG. 3 packet switch configuration;

DETAILED DESCRIPTION

In the following description, various embodiments are described as "packet switches." This term is not meant to convey any precision beyond the intended meaning that such a device receives packet data and retransmits at least some received packet data, with several possible ingress-to-egress paths. The methodology used to determine the path, whether it be routing or switching, and the packet attributes used to determine the path, are not directly relevant to the embodiments described below. It is assumed that packet data is appropriately queued by some means for transmission between an ingress unit and an egress unit on the switch.

As used herein, a switch fabric has multiple data inputs and outputs that can be cross-connected in different configurations. An epoch-scheduled packet switch schedules switch fabric configurations on a per-epoch basis. An ingress unit supplies epoch data to a switch fabric, and an egress unit receives epoch data from a switch fabric. A port pipe is a connection between a switch fabric input or output data port and an ingress unit or egress unit. The port pipe may contain intermediate devices that reformat, split, or combine port pipe data along its path. For instance, in some embodiments each ingress port pipe is divided into multiple port pipe threads, each transmitting a portion of each epoch word across a backplane to one of a plurality of switch fabric cards that are ganged together to create the switch fabric.

Figure 3:
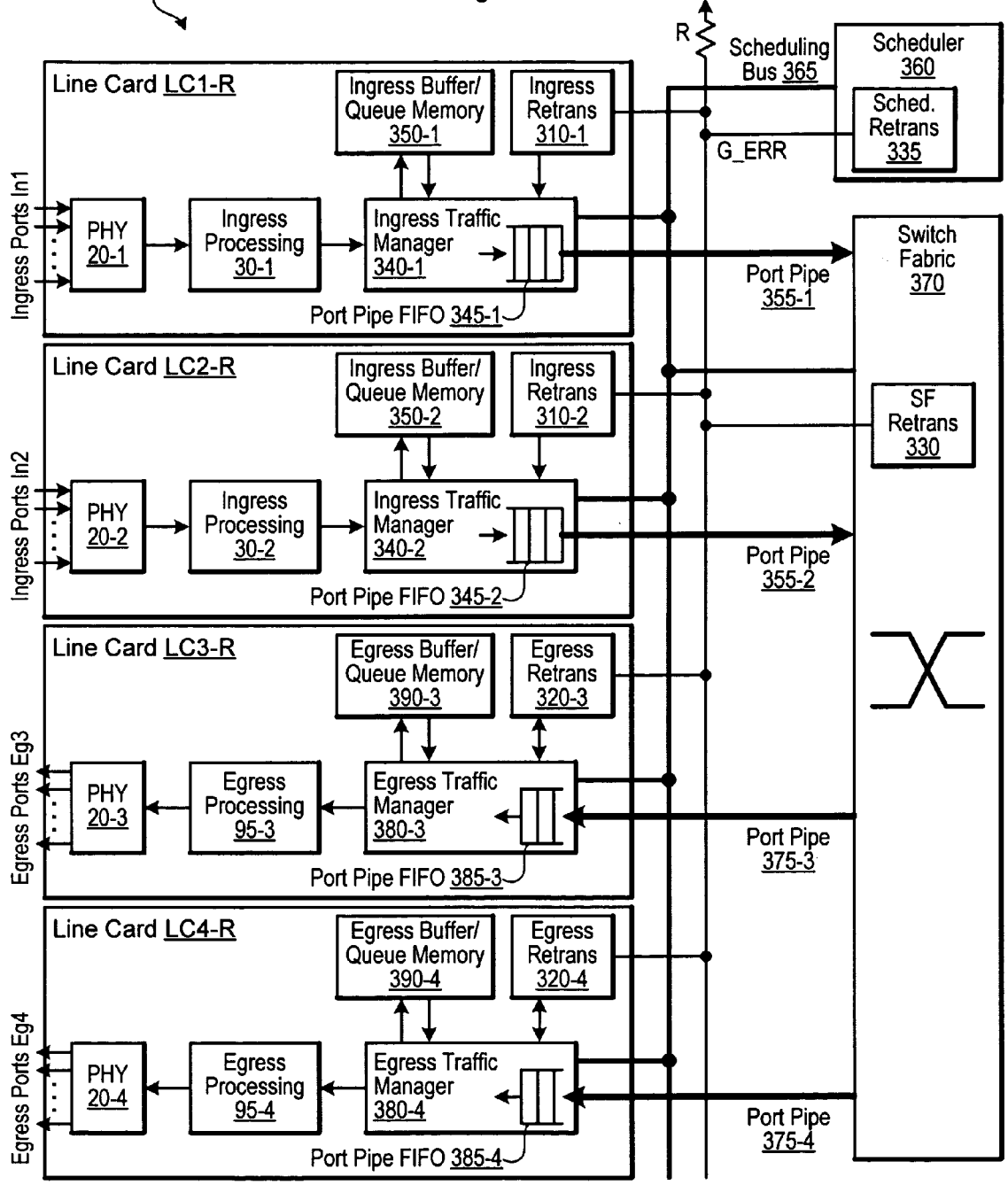
FIG. 3 illustrates an epoch-scheduled packet switch that uses global epoch retransmission according to one embodiment of the present invention.

FIG. 3 contains a block diagram for a packet switch 300 according to a first embodiment of the present invention. Four line cards LC1-R to LC4-R, a scheduler 360, and a switch fabric 370 are shown. Line cards LC1-R and LC2-R contain ingress retransmission logic 310-1 and 310-2, respectively. Ingress retransmission logic 310-1 and 310-2 communicate respectively with an ingress traffic manager 340-1 and an ingress traffic manager 340-2 to initiate retransmission, as will be explained further below. Line cards LC3-R and LC4-R contain egress retransmission logic 320-3 and 320-4, respectively. Egress retransmission logic 320-3 and 320-4 communicate respectively with an egress traffic manager 380-3 and an egress traffic manager 380-4, as will be explained further below.

Switch fabric 370 contains switch fabric retransmission logic 330 to allow switch fabric 370 to coordinate retransmission epoch timing when a retransmission is to occur. Scheduler 360 contains scheduler retransmission logic 335 to allow the scheduler to know when its granted epoch schedule is to be deviated from, and to act accordingly. Further details for these functions are included below.

A global error line G_ERR connects to retransmission logic 310-1, 310-2, 320-3, 320-4, 330, and 335. A pull-up resistor R also connects G_ERR to a logic high voltage, which is the nominal voltage on the line. In operation, either one or both of egress retransmission logic 320-3 and 320-4 are allowed to pull G_ERR to a logic low voltage at a predetermined time, after which the other retransmission logic units sample G_ERR to see if an epoch retransmission will be required.

Figure 4:
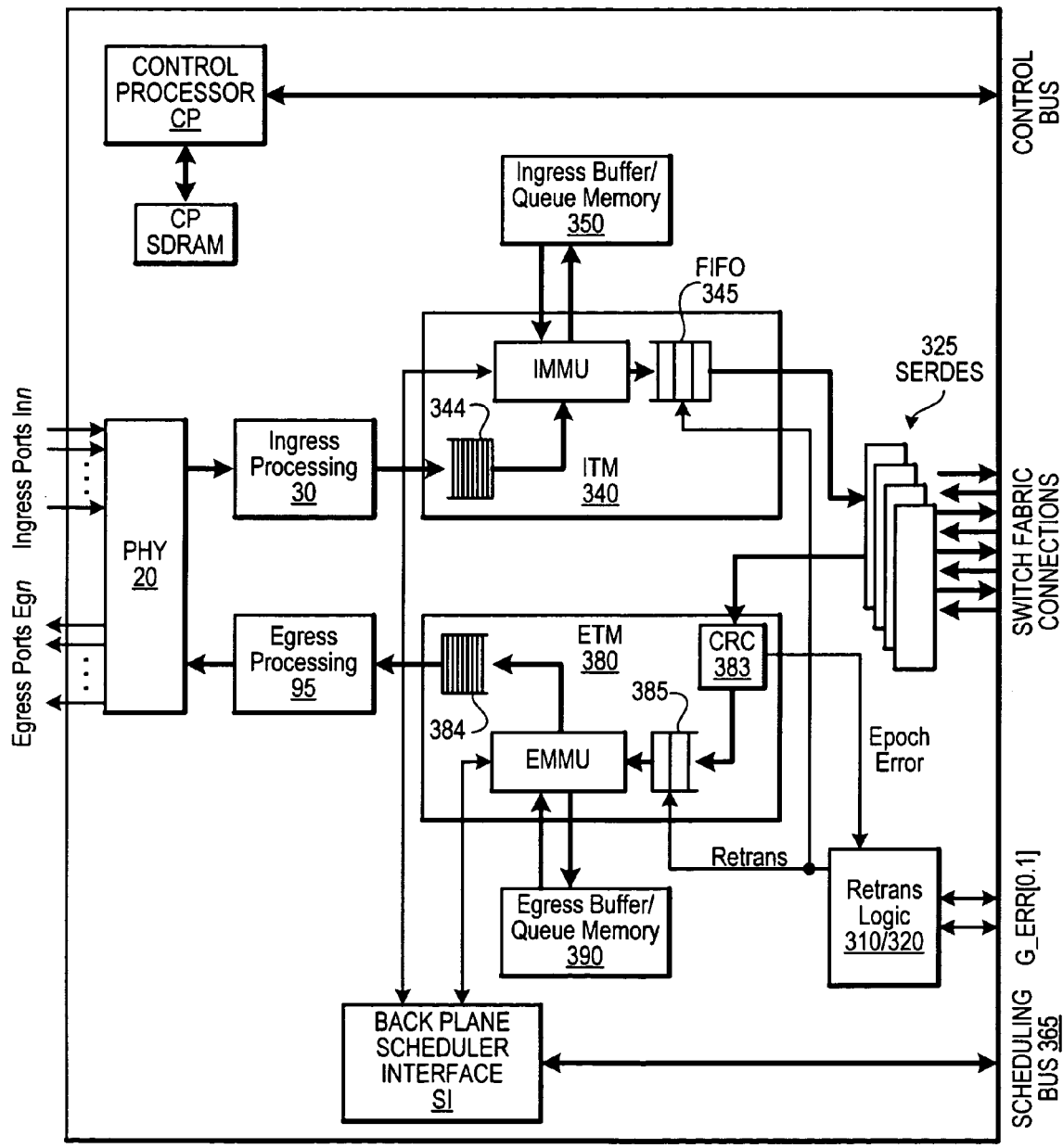
FIG. 4 shows a line card useful with some embodiments of the FIG. 3 packet switch configuration.

FIG. 4 shows details of a line card LCn-R useful with switch 300, containing both the ingress and egress functionality shown in the FIG. 3 line cards. It is assumed that the left-hand external connections shown on LCn-R are external switch ports, and the right-hand external connections shown on LCn-R connect to a backplane in a switch chassis, although other configurations are possible. PHY 20, ingress processing 30, and egress processing 95 function as previously described to service ingress packets on ingress ports Inn and egress packets on egress ports Egn. Additionally, a control processor CP and attached CP synchronous dynamic random access memory (SDRAM) communicate with a switch management unit (not shown) to manage the line card, obtain switch routing information, set line card parameters, etc. A backplane scheduler interface SI communicates with scheduler 360 across a backplane scheduling bus 365 to provide queue information to the scheduler, receive grants, etc. A set of SERDES (SERializer/DESerializers) 325 connect ITM 340 to a switch fabric ingress data port through a number of backplane serial connections, and connect a number of backplane serial connections from a switch fabric egress data port to ETM 380.

Retransmission logic 310/320 combines the functions of ingress and egress retransmission logic, as will be described further below. Two backplane global error lines, G_ERR [0.1], connect to retransmission logic 310/320 to provide redundancy. Other backplane connections exist but have been omitted for clarity. Where such connections are used to explain an embodiment, they are included in a more detailed drawing below of a line card subsection.

ITM 340 contains an Ingress Memory Management Unit (IMMU) that receives packets via a FIFO 344 from ingress processing 30, and stores the packets in virtual queues within ingress buffer/queue memory 350. The queues are "virtual" in that each is maintained as a linked list of memory segments that hold packets waiting in that queue—a packet is "added" to a queue by allocating any free memory segment to that packet, writing the packet to that segment, and adjusting a tail pointer for the appropriate queue to point to the allocated segment.

The IMMU communicates its queue information (which queues have data waiting, and how much is waiting) to backplane scheduler interface SI for forwarding to scheduler 360. When the IMMU receives a grant to transmit from one of the queues in an upcoming epoch, it consults the linked list for the queue, and reads packet data from queue memory 350 to an ingress port pipe FIFO 345.

Figure 5:
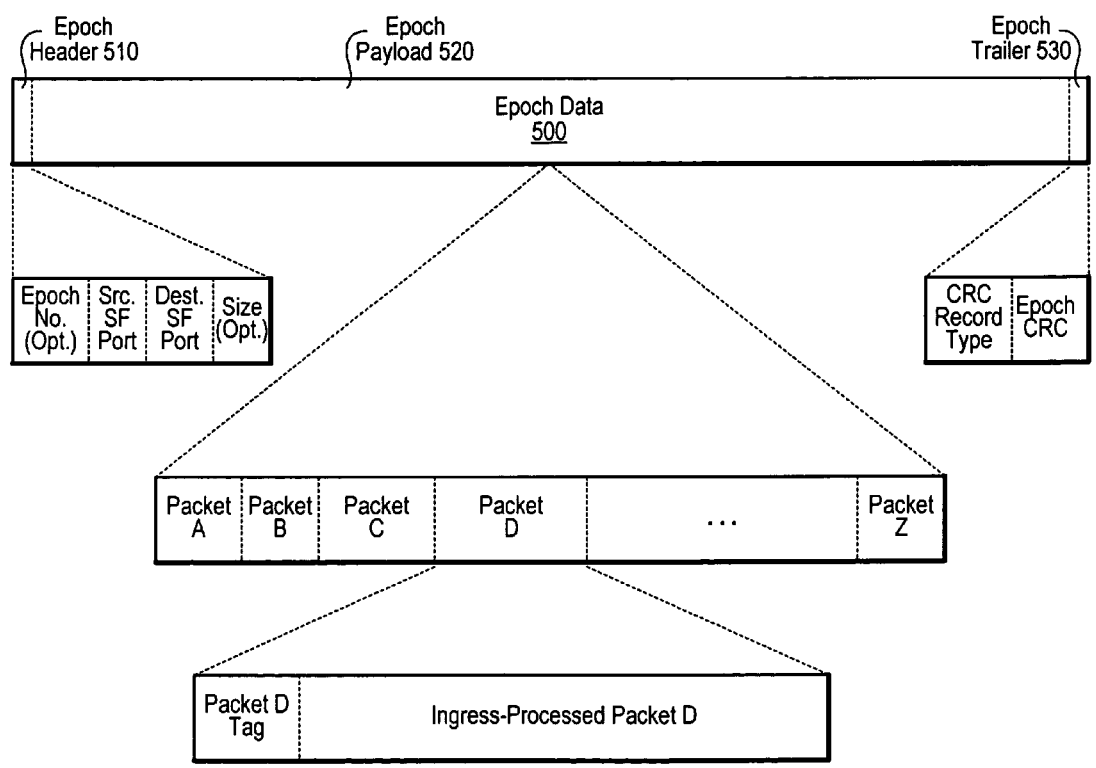
FIG. 5 depicts the organizational structure of epoch data for a single epoch.

FIG. 5 illustrates how the packet data is formatted for transmission through the switch fabric. Each epoch data frame 500 comprises an epoch header 510, an epoch payload 520, and an epoch trailer 530. The epoch data frame may extend up to a maximum size (generally between 3000 and 80,000 bytes) that can be transmitted in one epoch, although it can be smaller when the queue receiving a transmission grant does not hold a full epoch of data, or when the epoch is partially filled and the next packet waiting in the queue is larger than the remaining epoch space.

The epoch header 510 can contain identifying information for the epoch data frame, including an epoch number (in an embodiment that uses epoch numbers to identify retransmitted epochs), the source switch fabric port, and the destination switch fabric port (or multicast group ID for a multicast epoch). The epoch header 510 can also includes a size field indicating the length of the epoch data field 500. As an alternative to a size field, the epoch payload length can be fixed for each epoch, with each ingress traffic manager padding data as necessary to reach the fixed length. In one embodiment, the receiver can identify the end of the valid data by detecting a packet tag with a zero length—such a packet tag indicates all following epoch data is padding.

The epoch payload field 520 contains packet data. Although a very large packet, if allowed by the network, could possibly fill an entire epoch payload, in general data from many packets will be concatenated into payload 520. For instance, 26 packets A-Z are packed in payload 520, each consisting of a packet processed by ingress processing 30, with an attached backplane tag that will be removed during egress processing.

The epoch trailer field 530 contains a Cyclic Redundancy Code (CRC) field, and a CRC record type field. The record type has three possible values: Retransmit Allowed—No Error; Retransmit Allowed-Error Detected; and Retransmit Disallowed. Both Retransmit Allowed values indicate that the receiver may request epoch retransmission. The No Error value either indicates that no intermediate transmission unit has detected an error with the epoch, or no intermediate unit has checked. The Error Detected value indicates that an intermediate unit has already found an error with the epoch. The Retransmit Disallowed value indicates that if the epoch is received with errors, the receiver should discard or do the best it can with what is received, but should not request retransmission. Such a value can be used to indicate that the sender is incapable of retransmitting, is not allowed to retransmit (e.g., due to frequent errors on its port pipe), or is unwilling to retransmit (perhaps the epoch data in question has already been used in several attempted retransmissions, has a priority too low to warrant retransmitting, has a high cost of retransmitting such as when the transmission was multicast, or is time sensitive and stale). The trailer is a convenient place for the CRC record type and epoch CRC because it allows intermediate units to check the CRC as data passes through and modify the trailer if necessary. Alternately, CRC data or other error detection coding can be distributed throughout the epoch payload region.

In some embodiments, epoch payload data is channelized and sent to a distributed packet switch fabric. For instance, every eight bytes of packet data can be divided evenly among eight SERDES 325, such that each SERDES transmits one of the bytes over a port pipe thread to one of eight switch fabric cards. If a SERDES device or a switch fabric card component is to check epoch data integrity, the epoch CRC and CRC record type must pertain to data for the thread. If the epoch data integrity is to be checked only by the receiving ETM, the epoch CRC can be calculated over all epoch data.

When epoch data is received by SERDES 325 on line card LCn-R, it is passed to a CRC unit 383 within ETM 380. CRC unit 383 computes an epoch CRC (or multiple CRCs for a threaded CRC format) and compares the computed epoch CRC to the CRC in the epoch trailer. If the received and calculated CRCs do not match, CRC unit 383 generates an Epoch Error signal to retransmission logic 310/320. CRC unit 383 also notifies an Egress Memory Management Unit EMMU that the just-received epoch was received with errors.

Retransmit logic 310/320 may pull one or both of the global error lines G_ERR[0.1] low to signal a retransmission request when the Epoch Error signal is asserted. Various conditions, described in more detail below, may prevent such a request. When retransmission is requested by this line card or by another line card, retransmission logic 310/320 asserts a signal Retrans to Ingress Port Pipe FIFO 345 and Egress Port Pipe FIFO 385.

Figure 6:
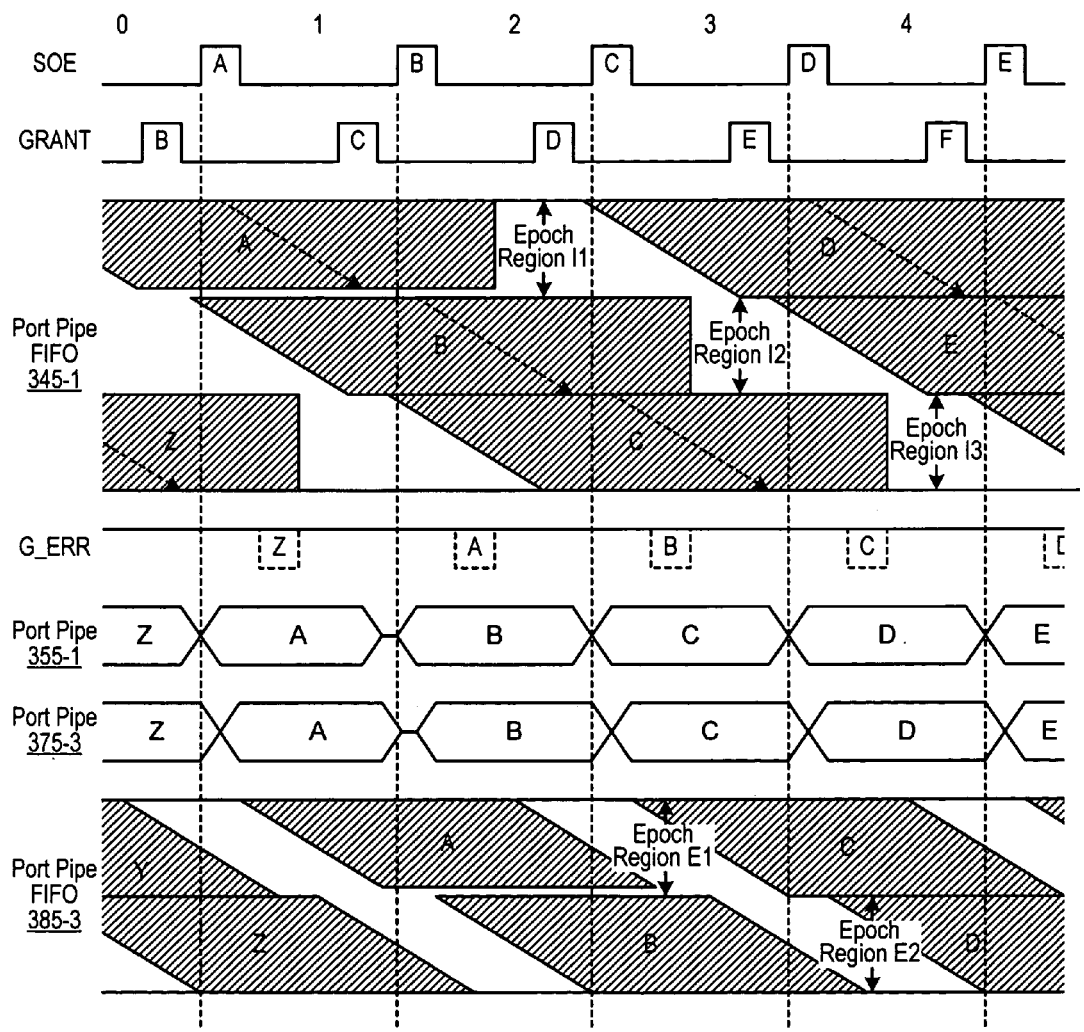
FIG. 6 contains a timing diagram illustrating no-error epoch operation for the FIG. 3 packet switch.
Figure 7:
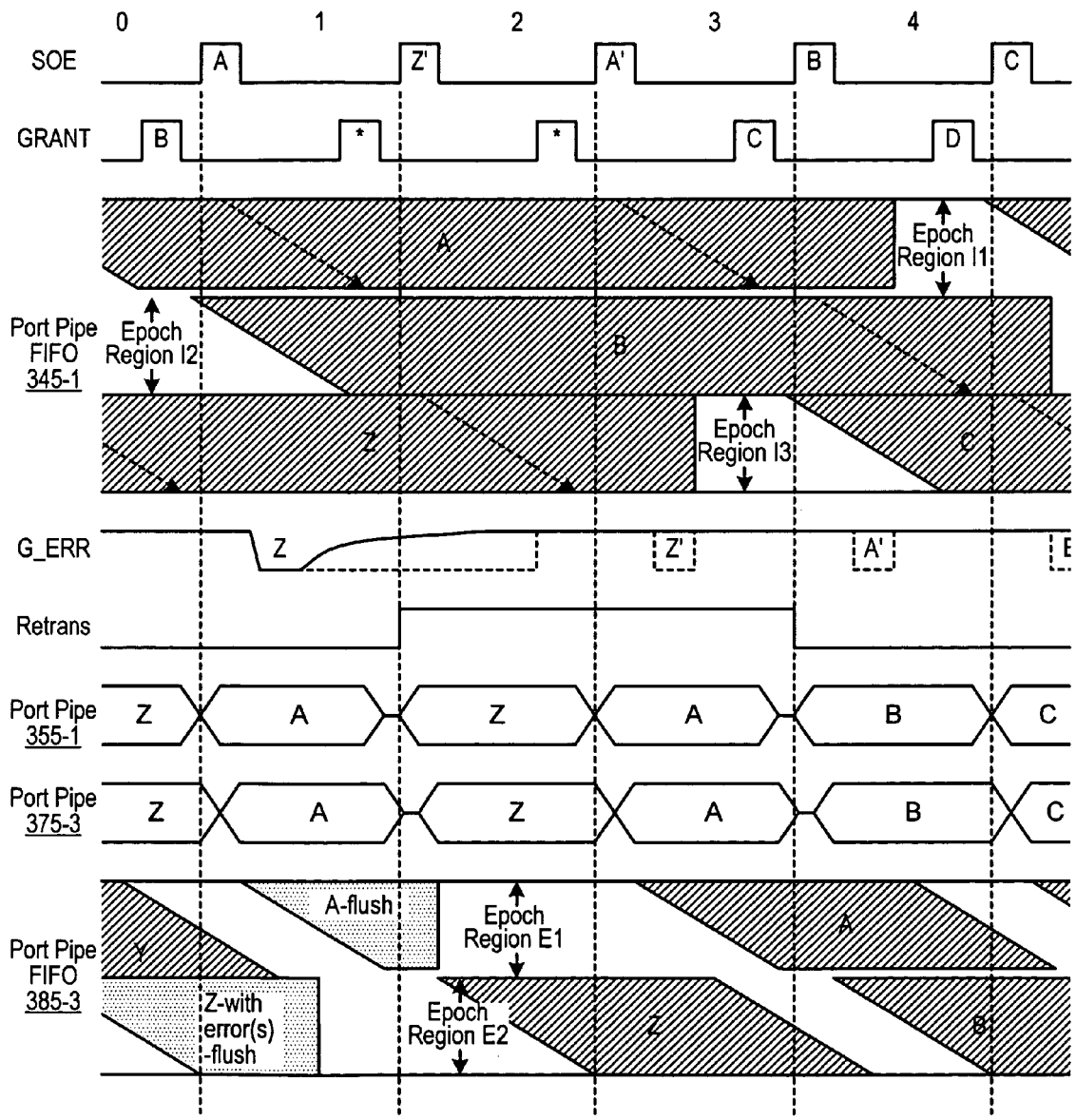
FIG. 7 contains a timing diagram illustrating error-and-retransmit operation for the FIG. 3 packet switch.

FIGS. 6 and 7 contain timing diagrams that further illustrate operation of the embodiment shown in FIGS. 3 and 4. To simplify the diagram and present a clear example, it is assumed that FIG. 3 line card LC1-R is continually granted transmission to line card LC3-R during the time frame illustrated (although not necessarily for the same priority queue). Those skilled in the art will be able to readily verify, however, that this same timing results in valid data transmissions with any ingress-to-egress-port grant pattern. FIG. 6 first shows timing with no epoch errors, and then FIG. 7 shows retransmission timing upon an epoch error.

Figure 1:
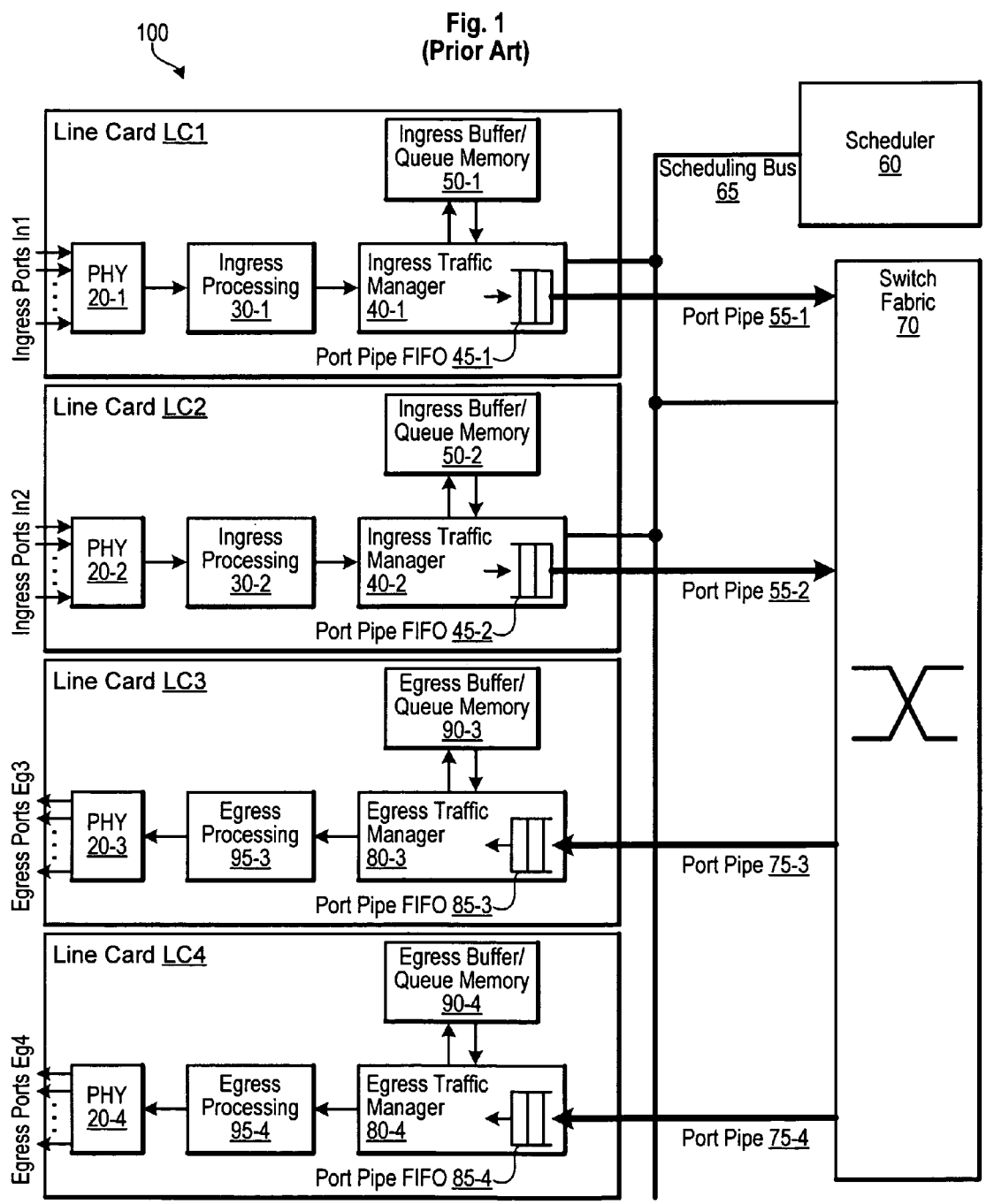
FIG. 1 illustrates a prior art epoch-scheduled packet switch.
Figure 2:
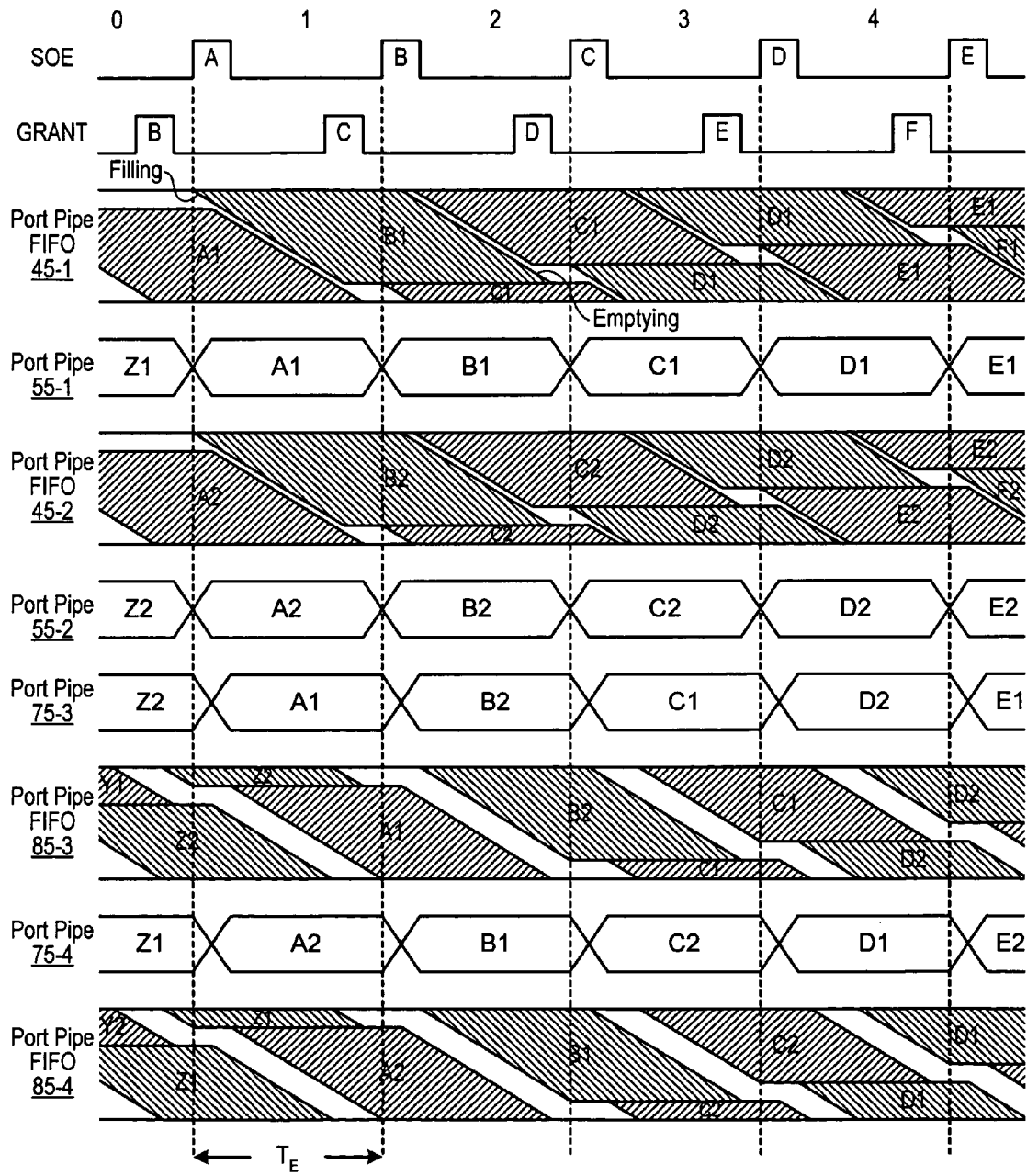
FIG. 2 contains a timing diagram illustrating epoch operation for the FIG. 1 packet switch.

Referring to FIG. 6, SOE and GRANT signals similar to those of FIG. 2 are shown. A buffer contents-vs.-time representation is shown for ingress port pipe FIFO 345-1 and for egress port pipe FIFO 385-3. The port pipe timing is also shown for port pipes 355-1 and 375-3. Finally, the voltage level on the global error line G_ERR is illustrated.

One difference from FIG. 2 is that port pipe FIFO 345-1 is designed to hold three epochs of epoch data and port pipe FIFO 385-3 is designed to hold two epochs of epoch data, as opposed to the 1.2 epochs each held by the FIFOs of FIG. 2. Preferably, FIFOs 345-1 and 385-3 are divided into fixed epoch regions—successive epochs begin filling a FIFO at the start of the next epoch region, even when the preceding epoch did not completely fill its epoch region. In FIG. 6, three ingress FIFO epoch regions I1, I2, I3 and two egress FIFO epoch regions E1, E2 are indicated. Thus even though epoch data A does not fill its entire ingress epoch region I1 or egress epoch region E1, epoch data B begins filling the FIFOs, respectively, at the beginning of epoch regions I2 and E2.

Another difference from FIG. 2 is that the ingress FIFO contents are not released from the ingress FIFO immediately after they have been read to port pipe 355-1. For example, epoch data B is read from port pipe FIFO epoch region I2 during epoch 2, but remains valid at least until the middle of epoch 3. The determining event for whether epoch data B is released at the middle of epoch 3 is the condition of the global error line G_ERR. The dashed sample interval B appearing during epoch 3 for G_ERR represents the sample window during which a receiving line card should assert an error—by pulling G_ERR low—when epoch data B transmitted during epoch 2 is received with errors. It is assumed that ingress line card LC1-R sampled G_ERR during the sample window and found the global error line high. Accordingly, the ingress traffic manager 340-1 knows that it can release epoch data B from FIFO 345-1 after the epoch 3 sample window closes, as the time for asserting G_ERR for epoch data B has passed.

At the egress FIFO 385-3, ETM 380-4 also waits for the passing of the G_ERR sample window. Considering epoch data B, that data—which was all resident in FIFO epoch region E2 by the end of epoch 2—is held in FIFO 385-3 until the middle of epoch 3 and the end of the G_ERR sample interval B. As no epoch error was sampled, ETM 380-4 begins reading epoch data B from FIFO 385-3 during the middle of epoch 3.

FIG. 7 illustrates the timing scenario of FIG. 6, except this time epoch data Z (received during epoch 0) is received with an error at one of the line cards. After epoch data Z is received and the error is detected, the line card detecting the error pulls the global error line G_ERR low during epoch 1, just before and during the sample time for signaling an epoch data Z error. This error signal causes a number of events to happen, at all ingress units, all egress units, the scheduler, and the switch fabric.

First, at the ingress units, the IMMU and ingress port pipe FIFO operations are altered. At the time the error is signaled, the LC1-R IMMU is spooling epoch data B to FIFO 345-1 epoch region I2, and FIFO 345-1 is reading epoch data A from epoch region I1 to port pipe 355-1. As a result of receiving the error signal, epoch data Z is not released from epoch region I3 during epoch 1, as it was in FIG. 6. Instead, the IMMU stalls its FIFO-fill operations for two epochs, after spooling epoch data B to epoch region I2. At FIFO 345-1, epoch data Z is retained in epoch region I3, and at the epoch 2 SOE signal (labeled Z'), epoch data Z is resubmitted to port pipe 355-1. During epoch 2, the G_ERR signal is ignored (see extended dashed line), as epoch data A will be retransmitted whether the epoch data A version transmitted during epoch 1 is received correctly or not. This allows G_ERR to rise slowly, through resistor R, back to a high logic level without triggering a second error in the epoch following an epoch in which an error is signaled.

During epoch 3, G_ERR is sampled again, and this time will indicate whether the second (Z') transmission of epoch data Z was received successfully. Since in this example the second transmission was successful, epoch data Z is released from FIFO epoch region I3 at the end of the G_ERR sample period.

Also during epoch 3, epoch data A is retransmitted, even though there may have been no error with that data on its first transmission. And finally, a grant for new epoch data C is received. During epoch 4, the ingress card resumes normal pipelined operation, filling epoch region I3 with epoch data C and emptying epoch data B to port pipe 355-1.

At each egress unit, the EMMU will stall its port pipe read operations upon receipt of the epoch data Z error signal. Port pipe 385-3 will flush its epoch data Z, and will flush its epoch data A after that data is received. Beginning with the second (Z') data transmission received during epoch 2 and verified as error-free during epoch 3, the EMMU and port pipe 385-3 will return to normal pipelined operation.

Note that in this embodiment it is not important which egress unit signals the error, as all line cards respond identically to the error. Alternately, the egress units that received data Z and A the first time without error may choose to process those versions and discard the second versions upon arrival. It is also noted that G_ERR relies on pull-up resistor R to pull it back high after an egress unit pulls it low—alternately, any egress unit that pulled G_ERR low (or, e.g., the scheduler) could be set to drive the line high before the end of the epoch in which it was pulled low. This would allow the line to reach a valid logic level before the next epoch, such that epoch data A (in this example) would not have to be automatically retransmitted when epoch data Z is retransmitted. The EMMU and/or port pipe FIFO 385-3 then would be responsible for placing epoch data A correctly after epoch data Z in sequence, though epoch data A was received first.

The above-described embodiment can improve the externally observable packet drop performance of a switch. For instance, consider a backplane with 512 switch fabric differential serial links, each transmitting data over epochs 10 microseconds in length. At a first transmission rate R=6 Gbps (Gigabits per second), each serial link has a measured bit error rate (BER) of $10^{-14}$, meaning about one out of every 100 trillion bits transmitted on the link will be in error. Assuming that errors on each link occur independently and singly (which are worst case assumptions, and generally inaccurate), on the average at least one link will corrupt its epoch data once every 32 seconds, resulting in the loss of up to one epoch (60,000 bytes distributed over eight strands) of packet data. The loss of 40 or more packets every half-minute may or may not be considered bad in a given application, but the above-described embodiment can prevent this loss by retransmission, saving the packets that would otherwise have been dropped due to this one transmission error.

One other potential application for the retransmission capability described above is for boosting the transmission rate across a backplane into a region where the receivers begin to observe errors that might be otherwise intolerable, without causing a corresponding epoch drop rate. For instance, suppose that the transmission rate R is increased to a second transmission rate of 7 Gbps and the epoch length is decreased to 8.57 microseconds such that the amount of data transmitted in an epoch remains constant. Using the same hardware, however, the BER hypothetically increases by a factor of 10,000 due to the speed increase, to a BER of $10^{-10}$. This translates to an epoch error, on the average, every 2.8 milliseconds, or once every 326 epochs. According to the embodiment above, then, two out of every 326 epochs would be used for retransmission to recover for the epoch error, for a 99.3% "good epoch" utilization rate. Because the speed was raised, however, 324 "good" epochs were transmitted compared to 280 "good" epochs over the same 2.8 milliseconds at a 6 Gbps rate, for a 15.7% increase in throughput. Although this example is hypothetical, it demonstrates how backplane throughput may be increased substantially using an operational scenario that is likely unthinkable (14,000 dropped packets/second due to backplane errors) without retransmission capability.

Figure 8:
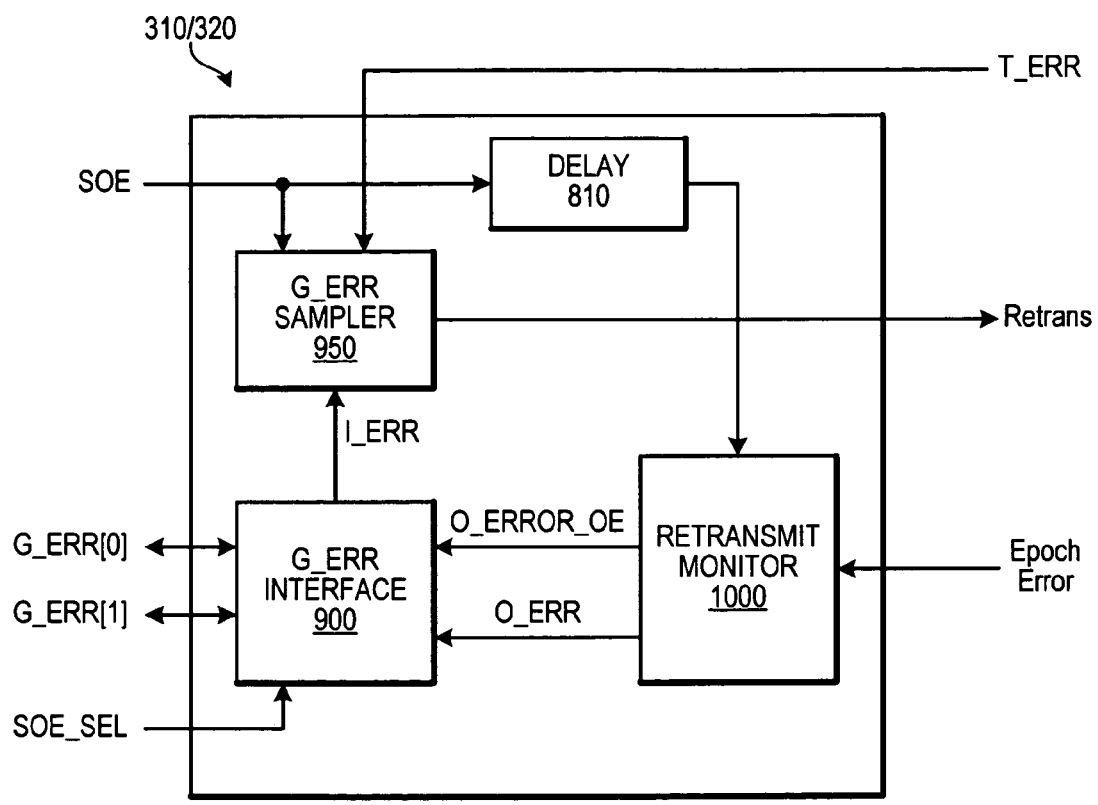
FIG. 8 depicts line card retransmit logic for the line card of FIG. 4.

FIG. 8 illustrates one embodiment for retransmission logic 310/320. The major functional blocks of the retransmission logic include a G_ERR interface 900 with receivers and drivers for two redundant G_ERR lines, a G_ERR sampler 950 to sample the received G_ERR signal (I_ERR from G_ERR interface) at an appropriate time in each epoch, and a retransmit monitor 1000 to determine if and when the line card should drive G_ERR low. Additionally, a delay unit 810 presents a delayed version of the SOE signal to retransmit monitor 1000.

Figure 9:
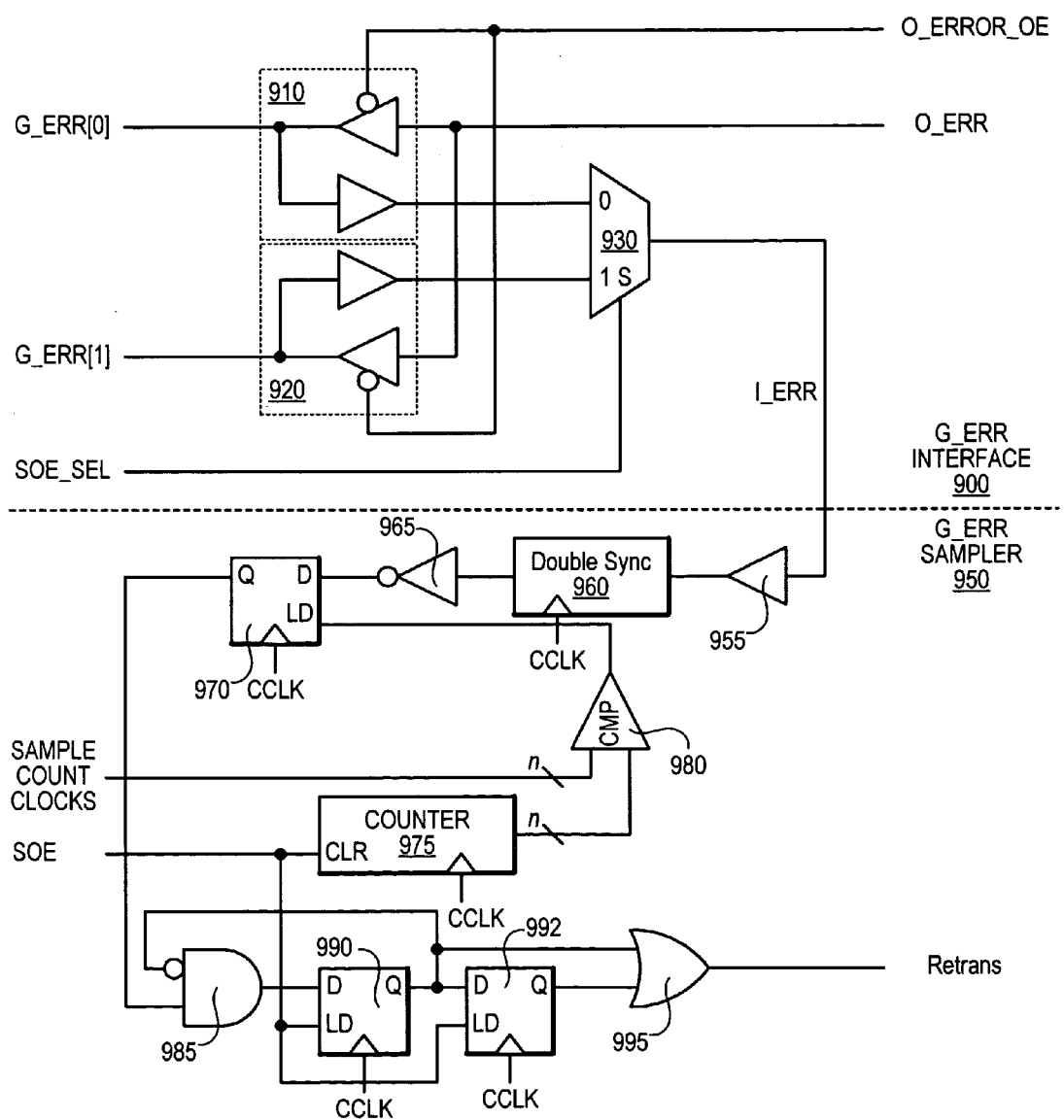
FIGS. 9 and 10 show circuit details for one embodiment of the line card retransmit logic of FIG. 8.

FIG. 9 shows logic detail for G_ERR interface 900 and G_ERR sampler 950. G_ERR interface 900 includes two receiver/driver pairs 910 and 920, connected respectively to G_ERR[0] and G_ERR[1], and a 2:1 logic multiplexer 930 that produces an input error signal I_ERR. In operation, the receiver in each receiver driver pair continuously buffers one of the G_ERR lines and supplies a corresponding logic level to one of multiplexer inputs 0 and 1. An SOE_SEL signal, e.g., received from a switch management unit, connects to the multiplexer address input S. When SOE_SEL is logic 0, a logic level corresponding to G_ERR[0] is generated as I_ERR; otherwise, a logic level corresponding to G_ERR[1] is generated as I_ERR.

The receiver/driver pairs 910/920 also each contain a tri-state driver with an input connected to O_ERR (generated by retransmit monitor 1000) and an output enable input connected to O_ERR_OE (also generated by retransmit monitor 1000). When O_ERR_OE is enabled, the two drivers drive the value of O_ERR onto respective G_ERR lines.

G_ERR sampler 950 determines whether a line card has pulled the currently selected G_ERR line low during the appropriate sample time. Input error signal I_ERR is supplied to a buffer 955, which supplies an output to the input of a double sync circuit 960. Double sync circuit 960 resolves any asynchronicity in I_ERR to produce a version synchronized to a clock CCLK. The output of double sync circuit 960 is inverted by an inverter 965 and supplied to the data input D of a flip-flop 970.

Separately, the SOE signal is supplied to the CLR input of a counter 975, which is also driven by CCLK. Counter 975 thus counts the number of CCLKs since the start of the current epoch, and supplies an n-bit count output to one input of an n-bit comparator 980. The other input of comparator 980 receives a sample count clocks value, e.g., from a programmable register (not shown). The output of comparator 980 is connected to the load input LD of flip-flop 970. Thus sample count clocks after the start of each epoch, comparator 980 evaluates TRUE, causing the synchronized and inverted value of I_ERR to be loaded to flip-flop 970.

An AND-gate 985, two flip-flops 990 and 992, and an OR-gate 995 generate the Retrans signal used internally to determine IMMU, EMMU, and ingress and egress port pipe FIFO behavior. The output of AND-gate 985 is connected to a data input D of flip-flop 990, and the output Q of flip-flop 990 connects to the data input D of flip-flop 992. Each flip-flop has a load input LD connected to the SOE signal. The outputs Q of flip-flops 990 and 992 are input to OR-gate 995, which generates the Retrans signal. Thus when either flip-flop 990 or 992 has a high output, Retrans is also high.

AND-gate 985 has one inverting and one non-inverting input. Output Q from flip-flop 990 connects to the inverting input, thus forming a feedback loop that ensures flip-flop 990 cannot produce a logic high output for two consecutive epochs. Output Q from flip-flop 970 connects to the non-inverting input. Thus when I_ERR is low sample count clocks after the start of an epoch, flip-flop 970 supplies a logic high value to its input of AND-gate 985, and the inverting input is low (assuming Retrans was not already high). AND-gate 985 generates a logic high input to a data input D of flip-flop 990. On the next SOE, flip-flop 990 clocks in the logic high and Retrans is driven high (see FIG. 7). And then on the following SOE, flip-flop 992 clocks in the logic high and Retrans remains high, while flip-flop 990 clocks in a logic low. On the third SOE following the I_ERR assertion, Retrans transitions low, unless retransmission was asserted again.

Figure 10:
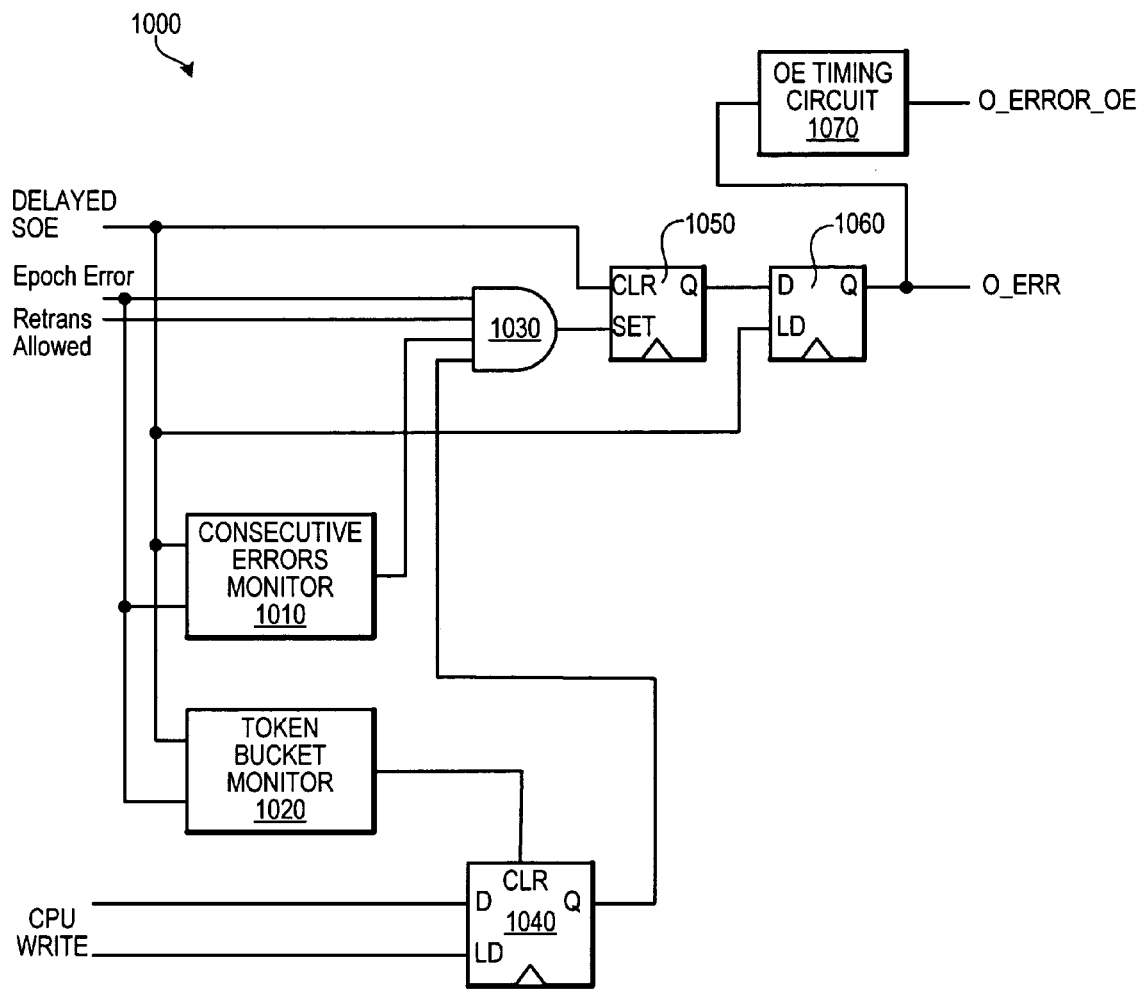

FIG. 10 contains a block diagram for an embodiment of retransmit monitor 1000. As inputs to retransmit monitor 1000, a DELAYED SOE signal is asserted after each epoch begins, but long enough after the SOE assertion for CRC unit 383 (FIG. 4) to compute a CRC for the prior epoch and assert Epoch Error when an error occurs. Also, a Retrans Allowed signal is generated from the FIG. 5 epoch trailer CRC record type, as received during the prior epoch, with asserted meaning a retransmission can be requested. Two CPU write inputs are provided, e.g., from control processor CP (FIG. 4), to allow software control of some aspects of monitor 1000.

A consecutive errors monitor 1010 and a token bucket monitor 1020 both receive the DELAYED SOE and Epoch Error signals. Consecutive errors monitor 1010 counts epochs received with at least one CRC error, and resets the count each time an epoch is received without an error. Should monitor 1010 ever count M consecutive epochs with an error, it disables its output signal, which is an input (along with Epoch Error and Retrans Allowed) to an AND-gate 1030. This prevents an egress unit that is receiving repeated errors from stalling the entire switch with repeated retransmission requests.

Token bucket monitor 1020 performs a companion function when errors are not consecutive but are frequent on a given egress port pipe. Token bucket monitor 1020 maintains a reservoir of "tokens" or "credits" that an egress unit can use to request retransmission. Over time, credits are issued and the token bucket is allowed to fill up to some maximum. When the egress unit detects errors in an arriving epoch, a token is consumed. Should all tokens be consumed, token bucket monitor 1020 deasserts its output until more tokens are credited.

The output of token bucket monitor connects to the clear input CLR of a flip-flop 1040 that is settable by control processor CP using the CP write signal path. When flip-flop 1040 is cleared, its output (which also forms an input to AND-gate 1030) disables retransmission requests.

The output of AND gate 1030 connects to the SET input of a set/clear flip-flop 1050 which is cleared each epoch by DELAYED SOE. At the same time flip-flop 1050 is cleared, its pre-clear output Q is loaded to an input D of a flip-flop 1060. The output Q of flip-flop 1060 forms the output O_ERR, and also triggers an OE timing circuit 1070 to generate an enable pulse O_ERROR_OE.

FIGS. 11A and 11B illustrate details for switch fabric 370 (FIG. 3) and it switch fabric retransmission logic 330. In this embodiment, multiple switch fabrics 370 are switched in parallel, each handling one or more threads of data from each ingress and egress port pipe. FIG. 11A illustrates the switch fabric that handles the n.0 threads for each port pipe—other identical switch fabrics would handle other threads in a multi-thread distributed switch fabric. Note that in other embodiments, all threads could be handled by a single fabric, or the port pipes could have a single thread.

In FIG. 11A, each ingress port pipe thread **355-*n*.0 is received by a SERDES 1130-*n*. For each epoch, the SERDES 1130-*n* receive the epoch data on the port pipe threads, possibly check for receive errors (in some embodiments the SERDES can manipulate the epoch trailer), and forward the epoch data to a switch matrix 1120. At the start of each new epoch, switch configuration block 1110 sets the switch matrix configuration for ingress port pipe threads 1-*n*. The epoch data is switched through switch matrix 1120 from the ingress SERDES 1130-*n* to appropriate egress SERDES 1140-*n*, according to the epoch configuration. Each egress SERDES 1140-*n* maintains a port pipe thread connection 375-*n*.0** with a line card egress unit.

During normal (no retransmit) operation, scheduler 360 (FIG. 3) communicates with a switch fabric backplane scheduler interface SI over scheduling bus 365. Scheduler interface SI receives a next epoch configuration for mapping n ingress threads to the egress threads, and transfers the configuration to switch configuration 1110 to be used during the next epoch.

Switch fabric retransmit logic 330 connects to the global error line G_ERR, e.g., using circuitry similar to the receive circuitry of FIG. 9 (the switch fabric does not drive the G_ERR line). When an egress card pulls G_ERR low to request a retransmit, retransmit logic 330 will assert a Recycle output signal during the next two switch fabric epoch configuration cycles.

FIG. 11B shows details for one switch configuration cell **1110-*n*, wherein each cell multiplexes one of the next epoch configuration lines, from backplane scheduler interface SI, with stored epoch configurations from past epochs. Operation is as follows. Each next epoch configuration line n is matched with a cell 1110-*n*. A cell flip-flop 1150 loads the value of the epoch configuration line when a load input LD is asserted. A multiplexer 1160 passes the flip-flop output Q through as switch configuration line n for the next epoch, unless Recycle is asserted. When Recycle is asserted, the output Q from a second flip-flop 1180** is passed through as switch configuration line n for the next epoch.

Flip-flop 1180 combines with another flip-flop 1170 to store the switch configuration line n value for the last two epochs. Switch configuration line n is fed back to an input D of flip-flop 1170, and the input D of flip-flop 1180 receives the output Q of flip-flop 1170. Flip-flops 1170 and 1180 are each loaded each time the SOE signal is asserted. Referring back to FIG. 7, the Recycle signal would be asserted during switch fabric configuration for epochs 2 and 3, which would cause the switch fabric to reuse the configuration for epochs 0 and 1 stored in flip-flops 1170 and 1180 when G_ERR is pulled low. Note that switch configuration cell **1110-*n* re-stores the reused configurations such that they could be re-used again if necessary for epoch 4 and 5** switch configuration.

Scheduler 360 (FIG. 3) also contains retransmission logic. Like the switch fabric retransmission logic 330, scheduler retransmission logic 335 receives but does not generate retransmit signals on G_ERR. When scheduler retransmission logic 335 receives a valid G_ERR retransmit request, it notifies the scheduler. The scheduler responds by issuing NULL grants to each ingress unit for the next two grant cycles (see GRANT for epochs 1 and 2 in FIG. 7). This prevents each IMMU from attempting to load epoch data to its port pipe FIFO while the FIFO is re-using prior epoch data.

Figure 12:
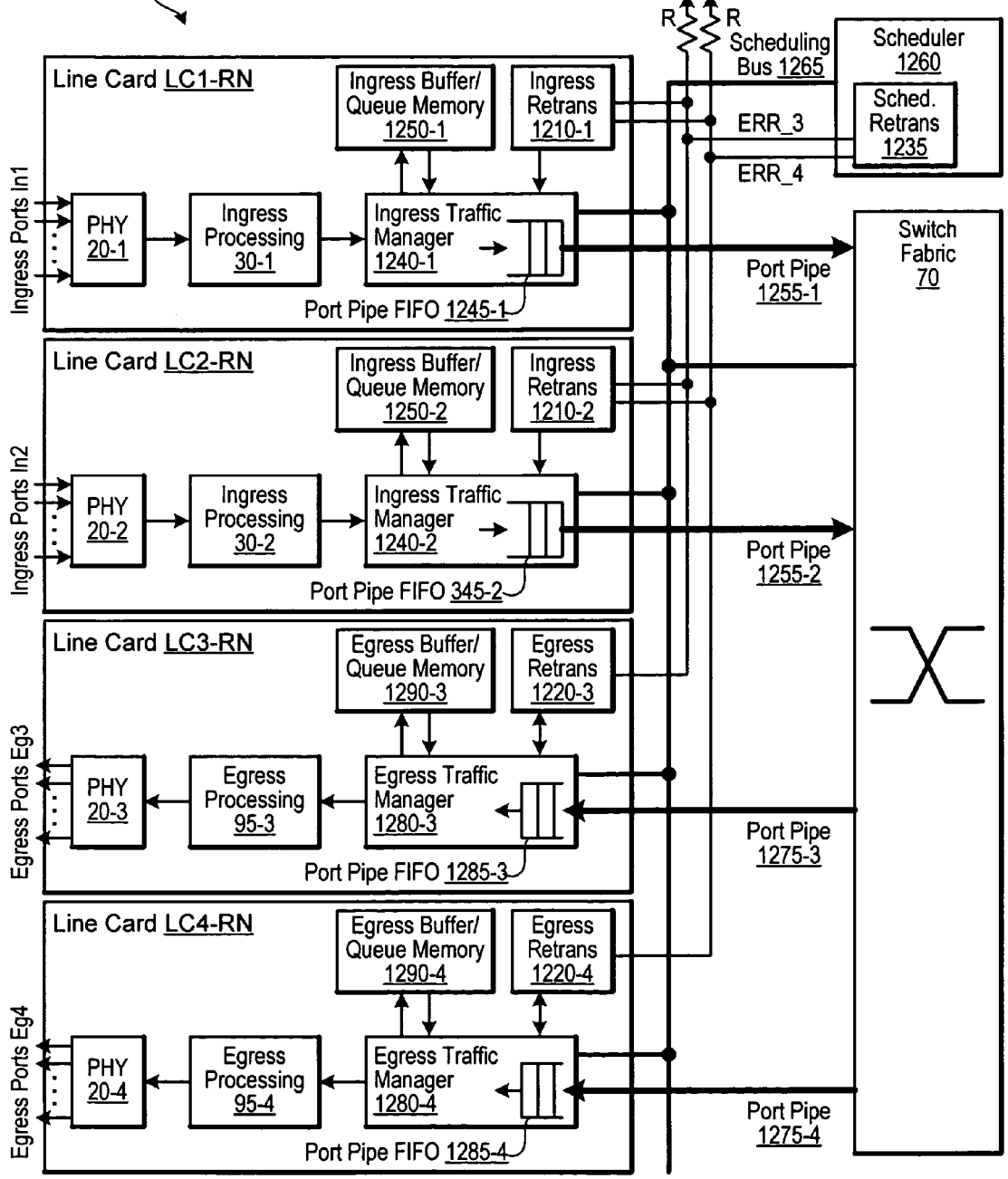
FIG. 12 illustrates an epoch-scheduled packet switch that uses peer-to-peer epoch retransmission based on the scheduler rescheduling the retransmit epoch data.

FIG. 12 shows a block diagram for a switch 1200 according to a second embodiment of the present invention. Instead of a global error line, switch 1200 includes n error lines ERR_n, one for each egress unit. For instance, a line card LC3-RN comprises egress retransmission logic 1220-3, which drives an error line ERR_3, and a line card LC4-RN comprises egress retransmission logic 1220-4, which drives an error lie ERR_4. Although each error line is shown with a pull-up resistor R, the error lines could be driven continuously by the egress unit responsible for driving that line.

Each ingress unit has retransmission logic 1210-$n$ with receivers for each ERR_n line. A scheduler 1260 also has scheduler retransmission logic 1235 with receivers for each ERR_n line. Thus the ingress units and scheduler know which egress unit or units encounters an epoch receive error. It is not strictly necessary that switch fabric 70 know when epoch receive errors occur, although it could track such errors.

Figure 13:
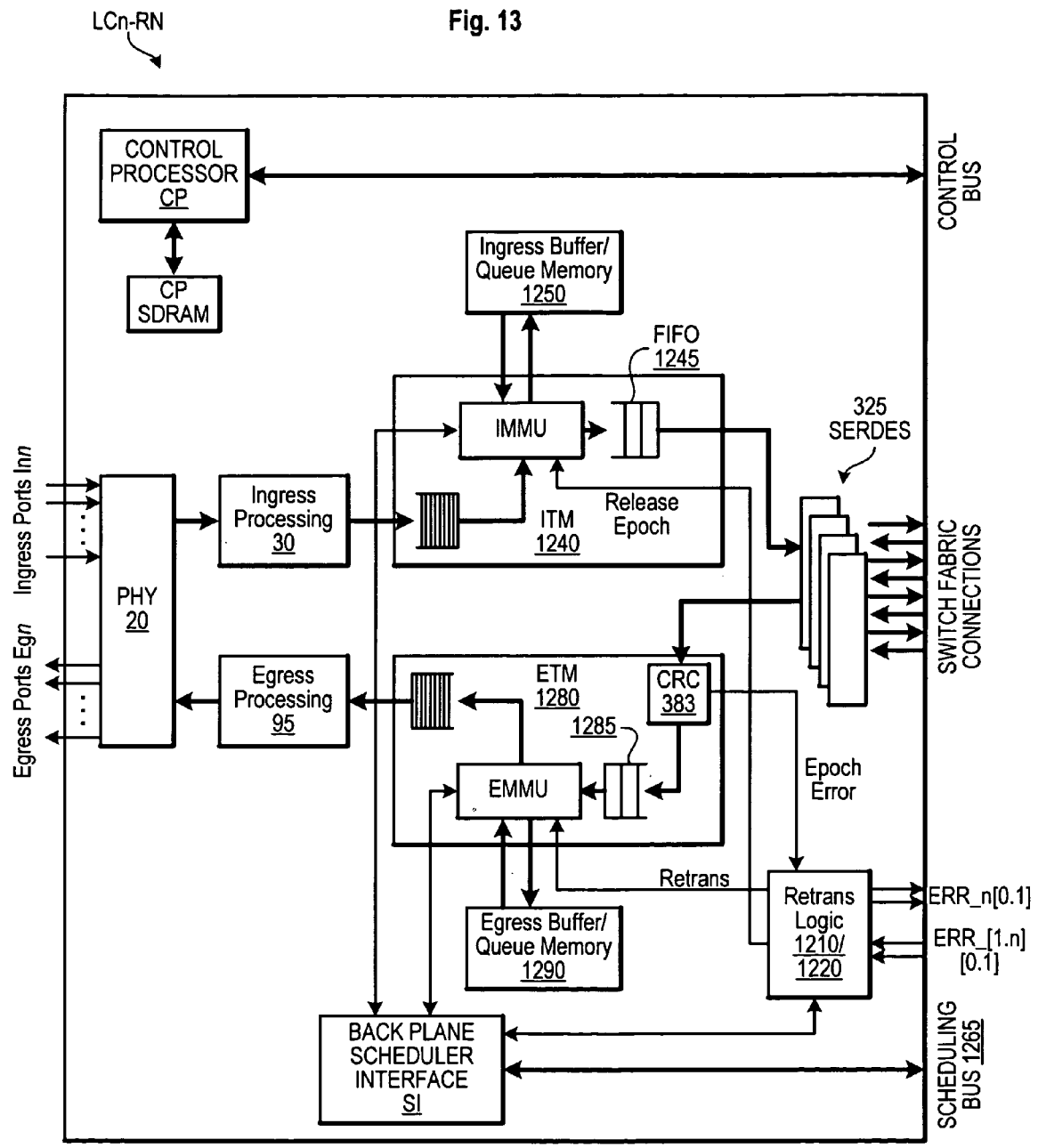
FIG. 13 shows a line card useful with some embodiments of the FIG. 12 packet switch configuration.

FIG. 13 illustrates further details for a line card LCn-RN useful in switch 1200. Components that have been described previously with respect to the FIG. 4 line card embodiment are not further described, except as they differ from the FIG. 4 embodiment.

Retransmission logic 1210/1220 connects to, instead of one pair of redundant backplane error lines, n pairs of such lines, and drives one pair of the lines according to similar logic and timing as used in the first embodiment. Retransmission logic 1210/1220 also receives schedule information from backplane scheduler interface SI, for the just-completed epoch. When an error is signaled on one of the ERR_n lines, logic 1210/1220 compares the identity of the egress unit driving the error signal to the identity of the egress unit target(s) for the epoch data transmitted by line card LCn-RN for the last epoch. When no match exists (or no error is signaled), logic 1210/1220 asserts a Release Epoch signal to the IMMU in ITM 1240. When one of the targets of the last-transmitted epoch did have an error, the Release Epoch signal is not asserted.

Logic 1210/1220 has a Retrans signal that is asserted to an EMMU when a just-received epoch is to be retransmitted. Unlike in the first embodiment, the Retrans signal is not asserted except on a line card asserting an ERR_n line. All other line cards are allowed to accept their received epoch data.

FIFO 1245 need not have the ability to temporarily retain and replay epoch data upon error, although that is another way to structure this embodiment. Instead, the IMMU does not immediately free memory in queue memory 1250 when it writes packet data to FIFO 1245. The IMMU stores, in pending registers (not shown), head and tail pointers to the queue memory 1250 packet data written to the FIFO. The pending registers are allowed to free the areas of memory 1250 associated with epoch data once the time has passed for a retransmission to be requested. When a retransmission is requested, the pending register pointers are used to re-access the packet data used for a previous epoch.

Figure 14:
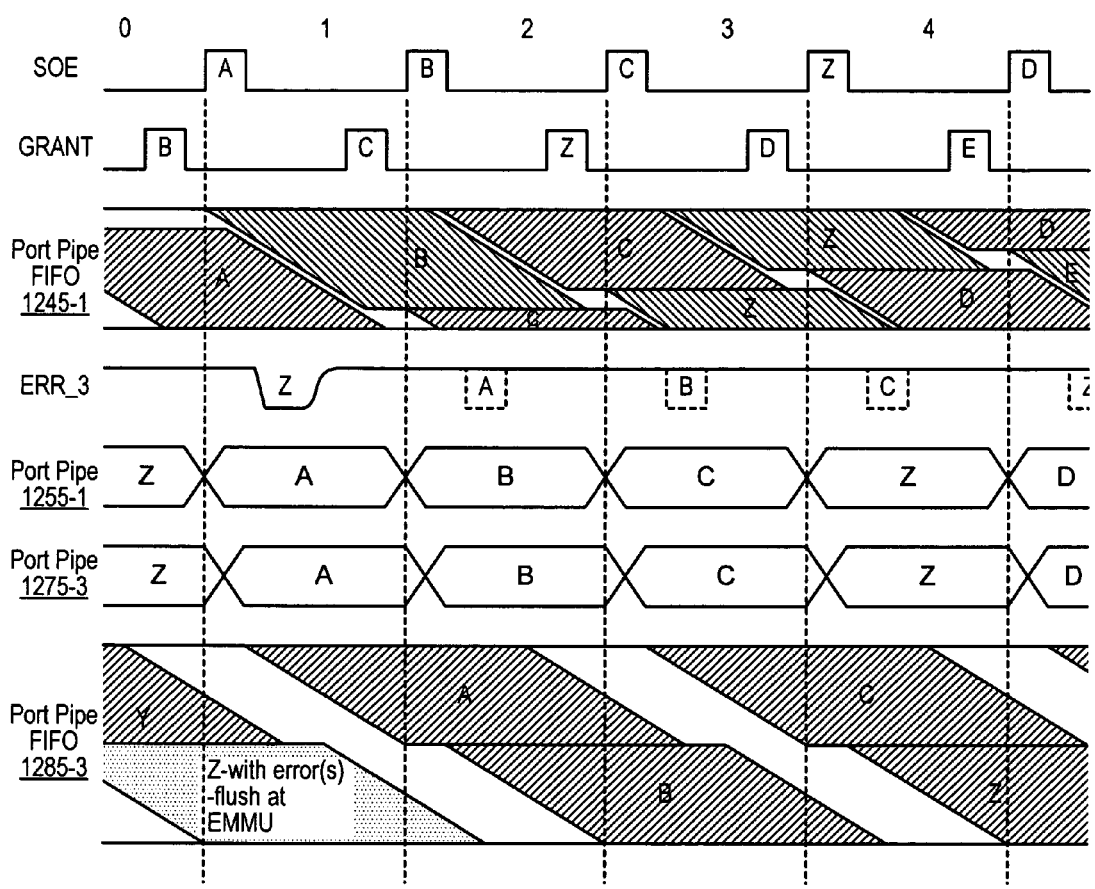
FIG. 14 contains a timing diagram illustrating error-and-retransmit operation for the FIG. 12 packet switch.

FIG. 14 further illustrates operation of this embodiment, again for an error in epoch data Z first transmitted during epoch 0 from line card LC1-RN to LC3-RN. On LC3-RN, CRC 383 detects the error near the end of epoch 0, and asserts the Epoch Error signal to retransmit logic 1220-3. Retransmit logic 1220-3 pulls ERR_3 low at the appropriate time during epoch 1 to signal an epoch 0 error. Retransmit logic 1220-3 also asserts Retrans to the EMMU in ETM 1280, causing the EMMU to flush epoch data Z. The EMMU also holds a place, however, for a later retransmission of epoch data Z to be reinserted in the data stream.

Meanwhile, scheduler 1260 and the line cards receive the ERR_3 retransmit request. Line card LC2-RN ignores the request, as it determines that it was not involved in the faulty transmission. On line card LC1-RN, retransmit logic 1210-1 does not assert Release Epoch, causing the IMMU in ITM 1240 to retain pending register pointers to the epoch 0 data Z. On scheduler 1260, retransmit logic 1235 knows that it must reschedule the data Z transmission.

In the scenario shown in FIG. 14, it is assumed that insufficient time remains in the request/grant negotiation for epoch 1 to insert a retransmission grant (this may not hold true for all embodiments). Thus the scheduler waits until epoch 2, and grants line card LC1-RN permission to retransmit epoch data Z during epoch 4. This grant can be made in a preliminary phase, prior to arbitration for normal-mode grants. A special code can also be transmitted with the grant, indicating to the sending line card that the grant is for a retransmission.

During epoch 3, line card LC1-RN accesses the pending register pointers and rebuilds an epoch containing epoch data Z. During epoch 4, the data Z is retransmitted. Line card LC3-RN receives the second transmission of epoch data Z correctly in this example. The EMMU registers that the requested retransmission has arrived, and correctly inserts the data into its queue memory 1290, ahead of epoch data A, B, and C.

As opposed to the first embodiment, this second embodiment has the advantage of not requiring all senders and receivers to participate in retransmission, and does not require that the switch fabric save and replay its configuration states.

One alternative for the above embodiment is to arrange the n error lines ERR_n by ingress unit instead of by egress unit. Each egress retransmission logic block determines, from the sender identity for its epoch data, the corresponding ERR_n line to pull low. Each ingress unit monitors its ERR_n line and initiates a retransmission when its ERR_n line is pulled low.

Figure 15:
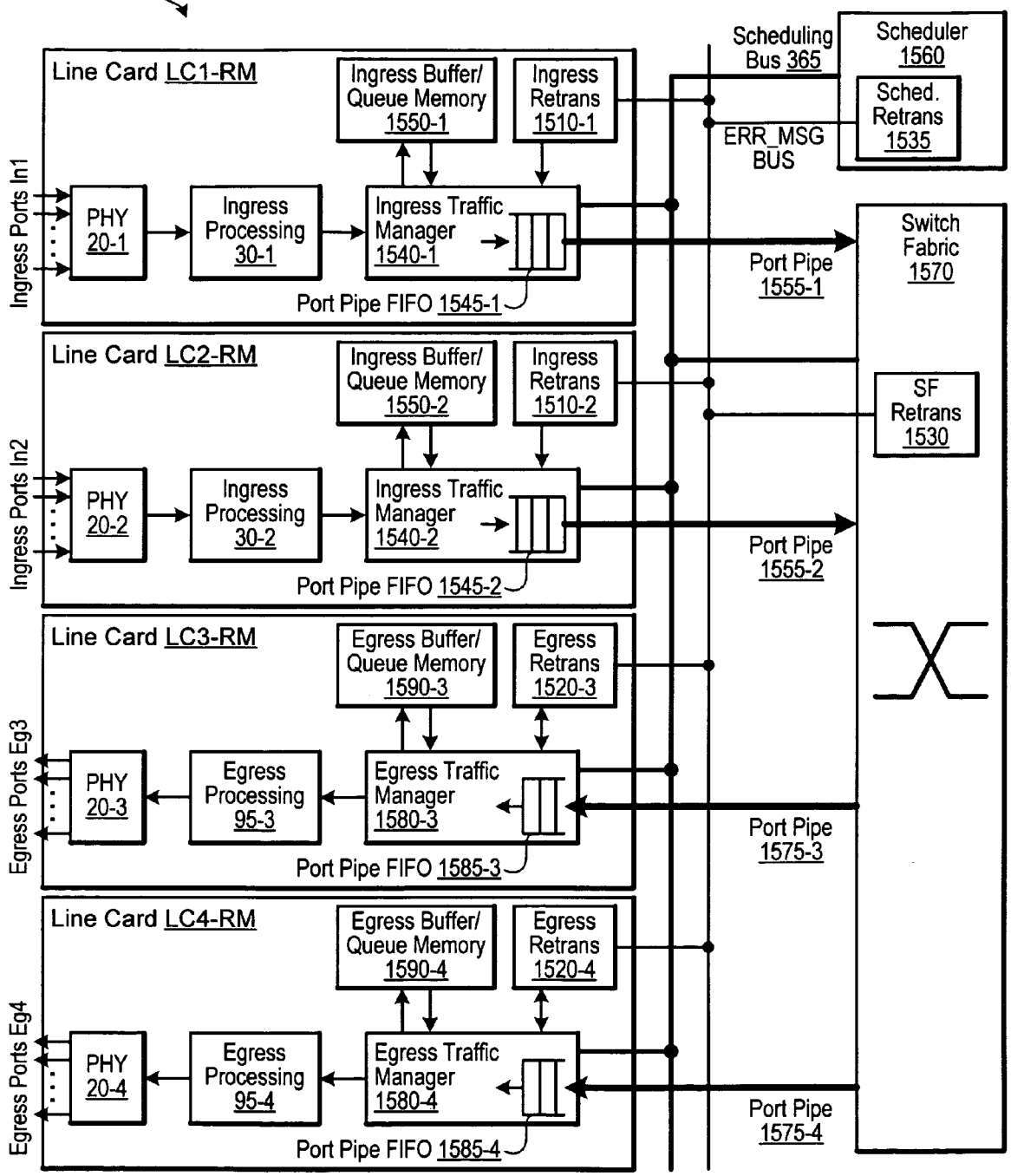
FIG. 15 illustrates an epoch-scheduled packet switch that uses an epoch error message bus according to another embodiment of the present invention.

FIG. 15 illustrates a switch 1500 according to a third embodiment of the present invention. This embodiment uses an ERR_MSG bus connected to retransmission logic 1510-$n$, 1520-$n$, 1530, and 1535 respectively associated with line card ingress units, line card egress units, a switch fabric 1570, and a scheduler 1560. The ERR_MSG bus is, e.g., a CSMA/CD (Carrier Sense Multiple Access/Collision Detect) bus, such as an Ethernet or high-speed system management bus. All retransmission units listen on the bus for error message frames. The egress retransmission units broadcast error message frames on the bus when an error is received. An error message frame indicates the line card sensing the epoch error, and possibly an identification of the sending line card and the epoch, although the latter is not necessary when error message frames are only allowed during the epoch following the epoch with the receive error.

Figure 16:
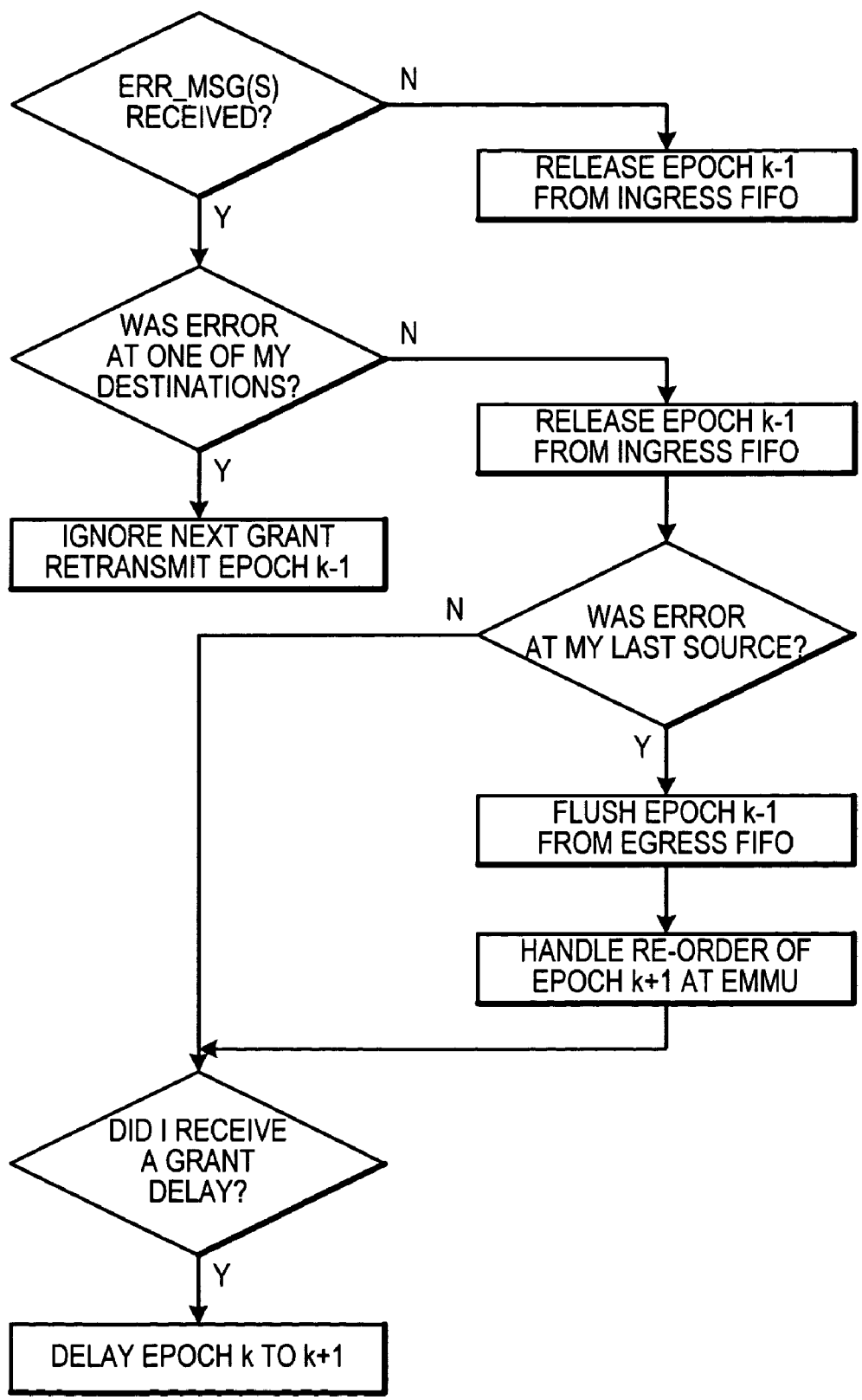
FIG. 16 contains a logic flow diagram for epoch error message processing.

FIG. 16 contains a flow diagram illustrating how ingress retransmission logic 1510-1 and 1510-2 process error message frames. First, if no error messages are received in the allowed time frame after the start of an epoch k, the ingress port pipe FIFO is allowed to release epoch data for epoch k−1. When an error message is received, the retransmission logic analyzes whether the error was received at one of the line card's destinations for epoch k−1.

Assuming the error was received at one of the line card's destinations, the epoch data from epoch k−1 is retransmitted at epoch k+1, and the epoch k grant from the scheduler is ignored. The data that was to be transmitted during epoch k+1 is delayed until epoch k+2.

When the error was not received at one of the line card's destinations, the ingress port pipe FIFO is allowed to release epoch data for epoch k−1. Because an error message was received and some line card will be retransmitting, however, further analysis is performed. If the error occurred in epoch data from the source of data received by a line card during epoch k−1, the line card can choose to flush its epoch k−1 data, whether an error was detected or not, and re-receive the epoch k−1 data at epoch k+1. This logic branch will always be taken for the line card generating an error message frame, and can be taken by receivers of a multicast frame.

Finally, each line card also determines whether it receives a grant delay. A grant delay is received instead of a pipeline transmission grant from the scheduler. The grant delay instructs an ingress unit that it should stall its FIFO for the next epoch, and then resume on the following epoch. The scheduler will determine which transmissions otherwise scheduled for epoch k+1 conflict with retransmission, and will issue a grant delay to stall those transmissions for an epoch.

Figure 17:
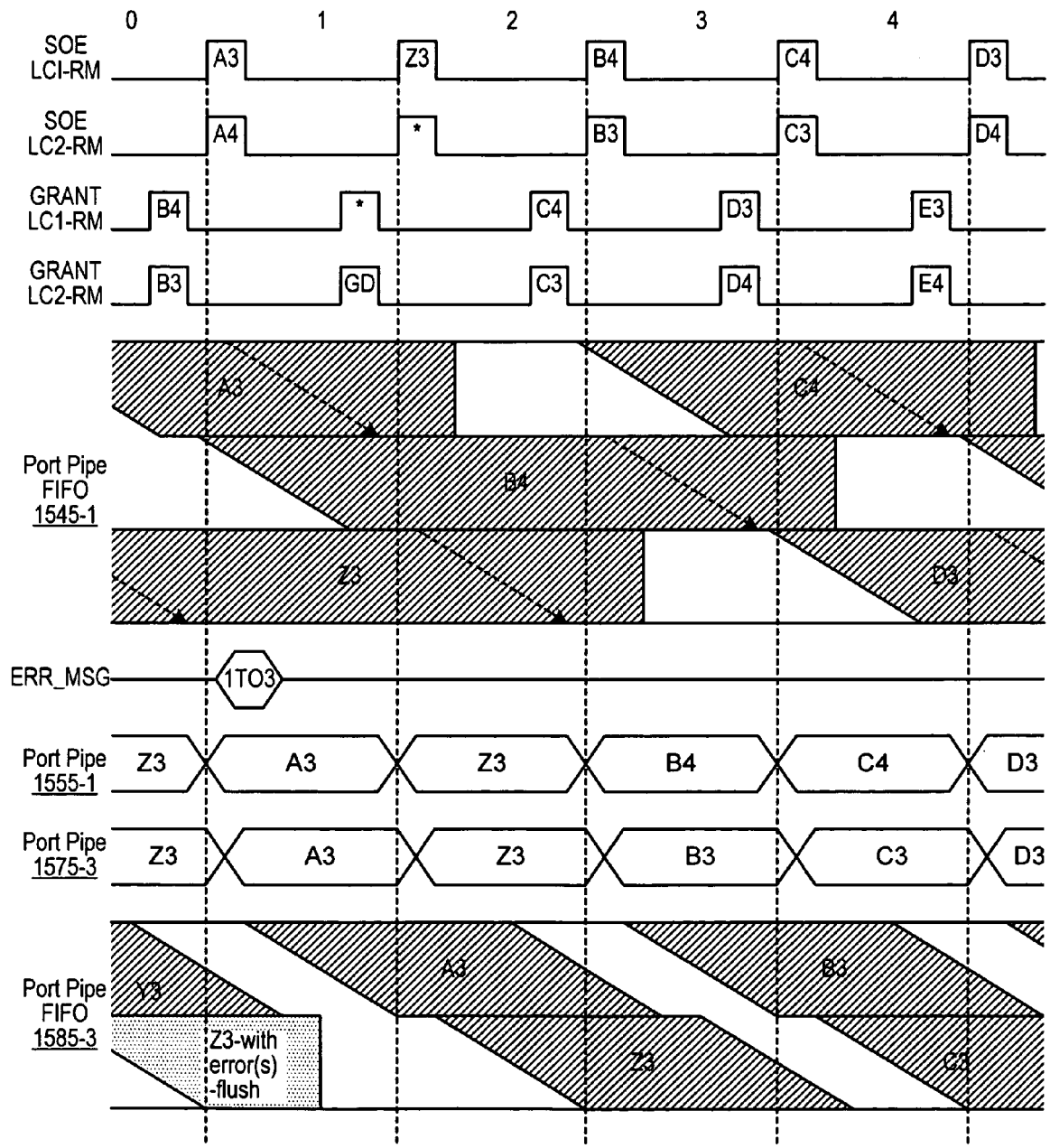
FIG. 17 contains a timing diagram illustrating error-and-retransmit operation for the sending and receiving units in the FIG. 15 packet switch.
Figure 18:
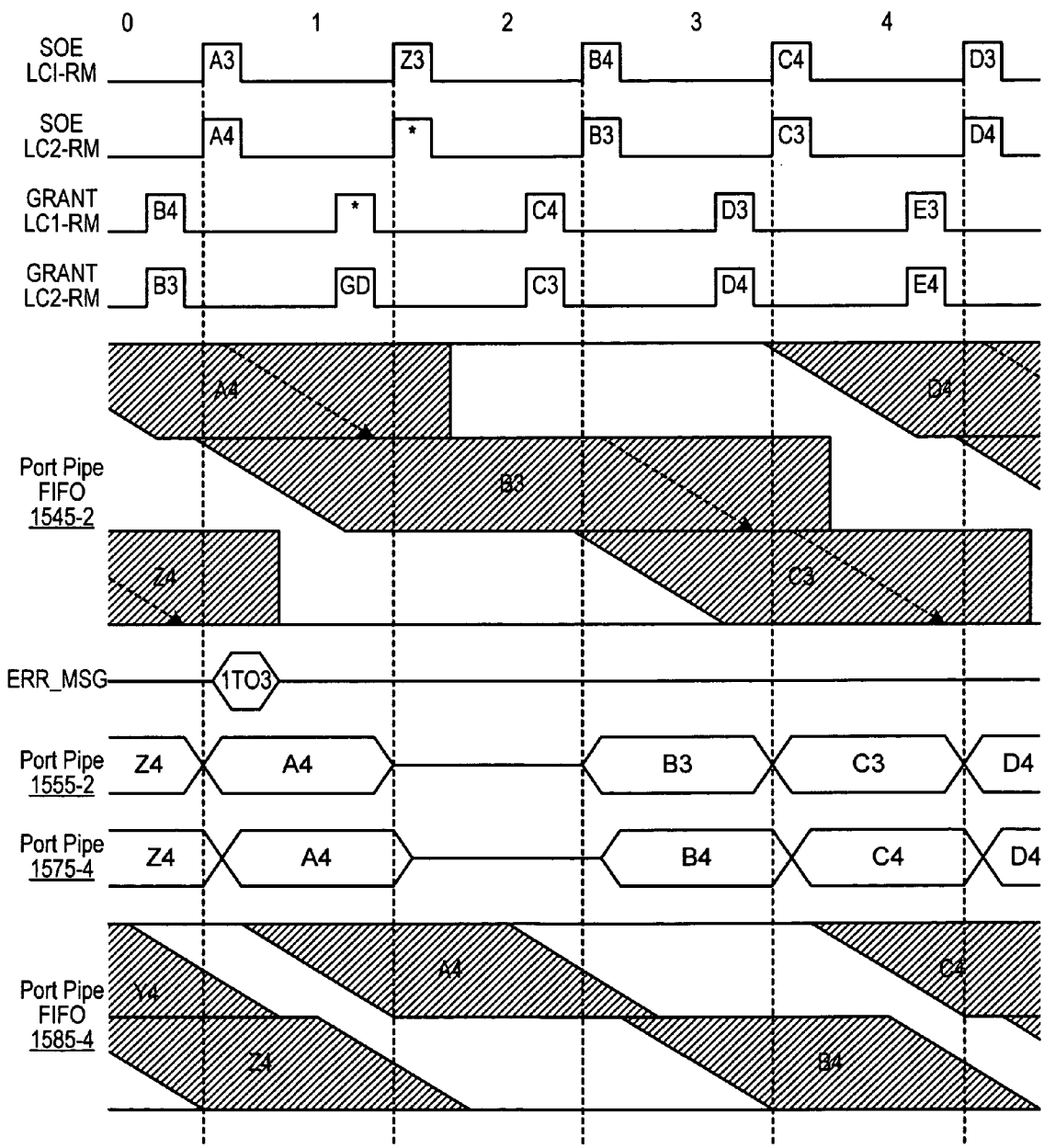
FIG. 18 contains a timing diagram illustrating operation of a sending and a receiving unit that were not involved in the epoch received in error, but whose scheduling is affected by the retransmission.

FIGS. 17 and 18 contain timing diagrams further illustrating timing for the FIG. 15 embodiment. Assuming that line card LC3-RM detects an error in epoch 0 data Z3 received from line card LC1-RM, it generates an error message frame 1T03 during epoch 1, and flushes epoch data Z3 from port pipe FIFO 1585-3.

Referring to FIG. 17, line card LC1-RM receives the error message frame 1T03, holds data Z3 in FIFO 1545-1, and ignores whatever grant is received from the scheduler during epoch 1. Instead, FIFO 1545-1 retransmits epoch data Z3 during epoch 2. Epoch data B4, which was initially scheduled for transmission during epoch 2, is held in FIFO 345-1 for transmission during epoch 3.

Referring now to FIG. 18, line cards LC2-RM and LC4-RM are also affected by the retransmission. Line card LC2-RM was initially granted permission to transmit epoch data B3 to line card LC3-RM during epoch 2. Due to the retransmission, however, the scheduler issues a grant delay (GD) instruction to LC2-RM, causing it to hold epoch data B3 during epoch 2 and transmit nothing on port pipe 355-2.

Line card LC4-RM also receives nothing on port pipe 375-4 during epoch 2, as its epoch 2 sender has been redirected to retransmit to another target.

Figure 19:
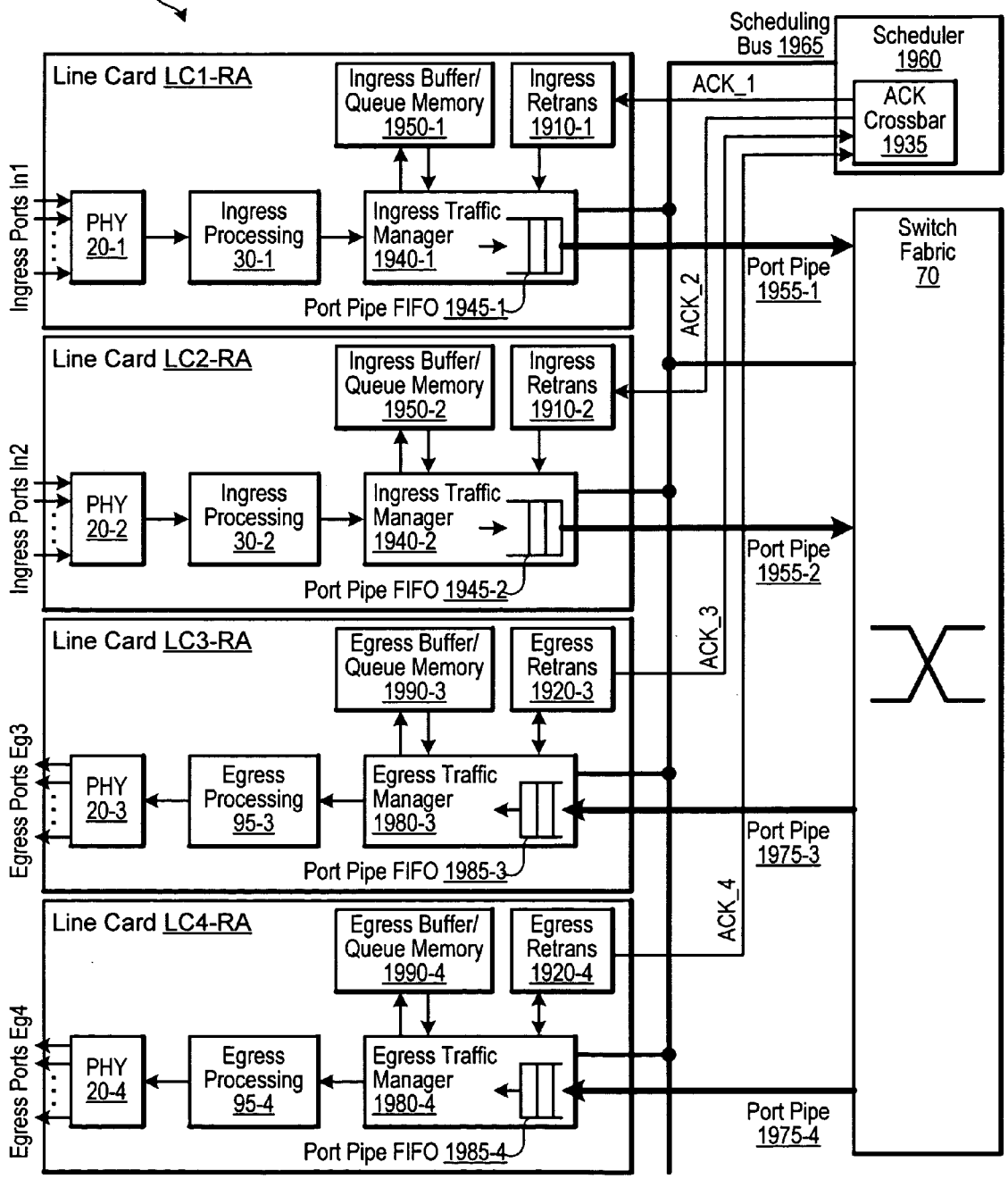
FIG. 19 illustrates an epoch-scheduled packet switch that uses acknowledgment tables in the ingress and egress units to handle epoch retransmission, according to yet another embodiment of the present invention.

FIG. 19 illustrates a switch 1900 according to a fourth embodiment of the present invention. A scheduler 1960 includes an ACK crossbar 1935. ACK crossbar 1935 receives epoch acknowledgment signals (e.g., ACK_3 and ACK_4) from egress units and forwards those epoch acknowledgment signals to the appropriate ingress units (e.g., signals ACK_1 and ACK_2). Each egress unit is expected to affirmatively acknowledge whether or not it successfully received an epoch. Each ingress unit is expected to retransmit epochs upon receiving a negative acknowledgment (NACK), or when no acknowledgment is received. The ACK signals can use, e.g., the scheduling bus, separate ACK lines, or a global error bus for transmission.

Figure 20:
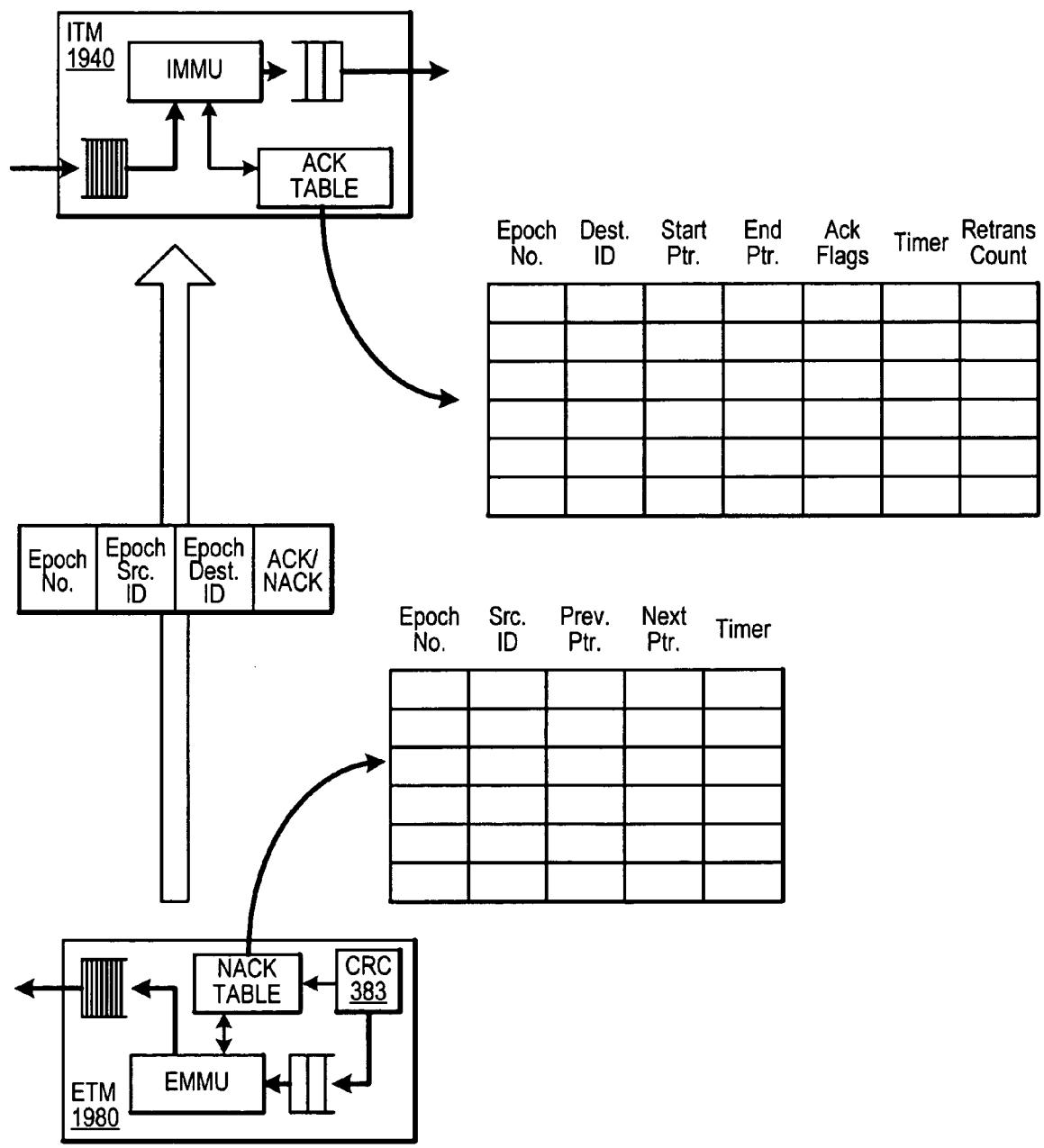
FIG. 20 contains acknowledgment table details for the FIG. 19 embodiment.

FIG. 20 illustrates data structures used in the FIG. 19 embodiment. The acknowledgment messages contain at least four fields: an epoch number, an epoch source ID, an epoch destination ID, and an ACK/NACK field. The epoch number identifies the epoch which is being ACKed or NACKed. The epoch destination ID identifies the message sender (i.e., the receiver of the epoch data being ACKed), and the epoch source ID identifies the message destination (i.e., the sender of the epoch data being ACKed). The scheduler ACK crossbar uses the source ID to forward the message to the ingress card responsible for the epoch data being ACKed.

Each ingress traffic manager (e.g., ITM 1940) maintains an ACK table of recently transmitted epochs. The ACK table includes, for each entry: the epoch number (which can be generated from a circular epoch counter of some duration longer than the maximum residency of a temporarily retained epoch); a destination ID, which can be a bitmap field with one bit for each possible egress destination; start and end pointers pointing to the epoch data in memory; ack flags, which can be a bitmap field with bit assignments corresponding to the bitmap field designations for the destination ID, the ack flags indicating which egress destinations have ACKed; a timer, which indicates a retransmission time for the epoch, should all destinations not positively ACK by that time; and a retransmission count, which is used to abandon retransmission efforts after some number of repeated failures.

As each epoch is transmitted, ITM 1940 stores a corresponding entry in the ACK table. When an acknowledgment is received, the entry corresponding to the acknowledgement message epoch number is recalled. If the acknowledgment is a positive ACK, the ack flags are updated and XORed with the destination ID—if the XOR result is nonzero, the epoch has not yet been successfully received by all targets. If the XOR result is zero, the epoch has been successfully received by all targets—and thus the memory pointed to by start pointer and end pointer can be released, and then the ACK table entry is released.

When the acknowledgment is a NACK, the retransmission count is incremented and the epoch is rescheduled. This same action occurs should the timer expire without all expected positive ACKs being received.

In each egress unit, an ETM 1980 manages a NACK table. The NACK table includes, for each entry: an epoch number and source ID for an epoch that was received with errors; a previous pointer and a next pointer, which indicate where the epoch data should be inserted in the queue linked lists, should it be received successfully; and a timer to initiate a second NACK should a first NACK not result in a retransmission.

Each time ETM 1980 receives an epoch with errors and requests retransmission, it adds an entry to the NACK table. Subsequently, if an epoch is successfully received with an epoch number and source ID matching a NACK table entry, the previous and next pointers for the entry are used to place the epoch in its correct memory order, and the NACK table entry is deleted.

The embodiment of FIGS. 19 and 20 adds complexity to the ITM and ETM, but requires no special scheduler, FIFOs, or switch fabric retransmission logic, since all retransmissions occur within the normal scheduling framework.

Figure 21:
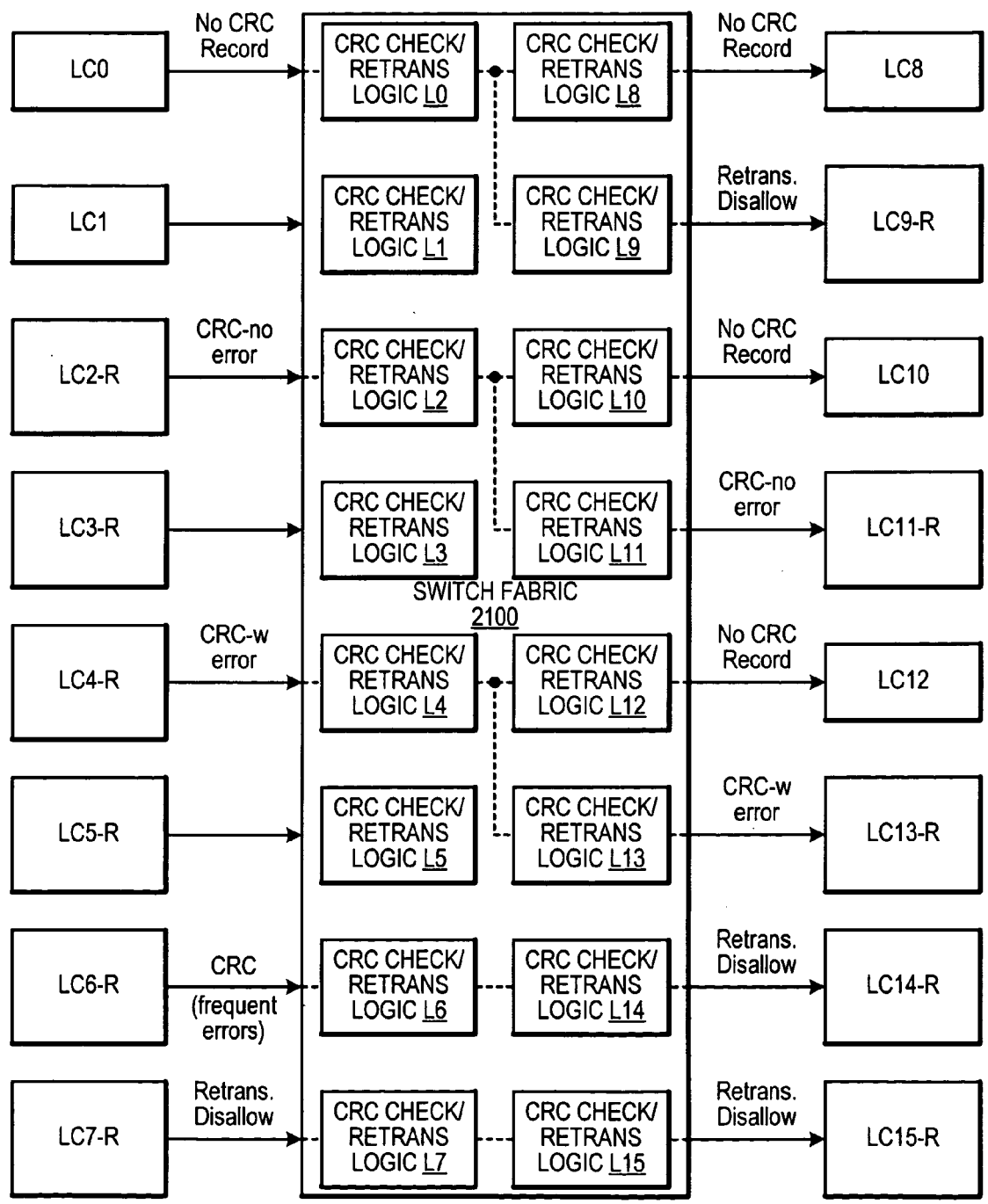
FIG. 21 illustrates a packet switch with a switch fabric capable of operating a mixed system having some cards capable of retransmit operation and some cards incapable of retransmit operation, and/or cards with repeated errors.

FIG. 21 illustrates operation of a switch fabric 2100 useful with various embodiments of the present invention. At each switch fabric ingress port and egress port, e.g., coincident with a backplane SERDES, CRC check/retransmission logic Ln is included. This logic can handle one or all of the following situations.

First, a line card LC0 is shown transmitting to line cards LC8 and LC9-R. The "R" suffix indicates that the line card is capable of sending/receiving epoch retransmissions; conversely, the lack of an R indicates a line card without retransmit functionality. Thus line card LC0 transmits epochs without a CRC record of the type explained in the description accompanying FIG. 5 (although the epochs may have a CRC). Logic L0 recognizes that LC0 cannot retransmit—logic L0 therefore assembles an epoch trailer for LC0 epochs with a CRC record, indicating retransmission is disallowed.

Logic L8 transmits to a line card that cannot retransmit, and therefore removes the CRC record inserted by logic L0. Logic L9, however, transmits to retransmit-capable line card LC9-R, and therefore keeps the retransmission disallowed CRC record intact to prevent LC9-R from requesting retransmission of an LC0 epoch.

A line card LC2-R is shown transmitting to two line cards LC10 and LC11-R. The epoch trailer indicates no error in the CRC, with retransmit allowed. Logic L2 receives the epoch and passes it unmodified unless an error is detected. Logic L10 removes the CRC record before passing the epoch to LC10. LC11-R receives the original epoch with a CRC record indicating no errors were found upstream, but retransmission is allowed.

A line card LC4-R is shown transmitting to two line cards LC12 and LC13-R. The epoch trailer indicates an error in the CRC even before the epoch leaves the line card (e.g., detected by a SERDES on the line card). Logic L4 receives the epoch and notes the error (the logic can use a token bucket or consecutive error monitor as described in FIG. 10 to count errors on the ingress port pipe). Logic L12 removes the CRC record, and LC12 will deal with the epoch errors if it can. Logic L13 transmits the original epoch trailer to LC13-R, which should request retransmission based on the CRC record.

A line card LC6-R is shown transmitting to line card LC14-R. Logic L6 receives epoch data from LC6-R, and has noted frequent errors on the link. It therefore sets the CRC record on each received epoch to retransmit disallowed. Note that LC14-R may be unaware that frequent errors are occurring with LC6-R, but the switch fabric logic prevents LC6-R from bogging the system with frequent retransmissions.

Finally, a line card LC7-R transmits an epoch to a line card LC15-R with retransmission disallowed indicated in the CRC record. It is the sending line card's prerogative to preemptively deny retransmission if it so chooses, for one or all epochs, and the switch fabric logic passes the disallowance through to the receiving line card.

Although the specific embodiments described above use an epoch length capable of spanning multiple 1500-byte packets, other embodiments can be designed to support substantially shorter epochs, e.g., "cell-based" switching with epoch data lengths possibly less than 100 bytes. In some such embodiments, transmitters can save epoch data for a substantially longer number of epochs, for example in a FIFO, to allow a receiver to signal back that a particular epoch should be resent. Because the epochs are substantially shorter, however, temporarily saving the last several hundred epochs may be no more difficult than saving 3 epochs in a long-epoch system.

Embodiments of the present invention also find potential application in a single-sender/single-receiver scenario, e.g., between two integrated circuits communicating across a printed circuit board. In such a case, the sender can temporarily save a data block to allow the receiver to request a retransmission. Such an approach can be applied across a full-mesh backplane, where each ITM maintains a serial channel to each ETM, with no intermediate switch. In such a system, epochs can be globally administered, or in the alternative determined by each sender/receiver pair.

Epoch formatting comprises preparing packet data according to an epoch-identifiable transmission unit such that epoch errors can be identified, and such that the formatted epoch can be retrieved or recreated for retransmission in the event of an error. Epoch identification can be explicit in the epoch format or implicit in the timing of the system. Epoch-formatted packet data may comprise, in various embodiments, the beginning, middle, end, or an entire packet, multiple packets, multiple packet segments, padding, and combinations thereof, with error checking information calculated and included for identifying errors across the whole epoch or portions thereof. Epoch data can be transmitted across a single data link or split among multiple links, and can be further coded/decoded along its path.

The preceding description has presented a few exemplary embodiments. Within this framework, it will be understood that different aspects of the embodiments can be combined in other ways, and not all features described with an embodiment are necessarily required for a basic implementation of the claimed invention. For instance, various embodiments can either maintain epoch data temporarily in a FIFO or maintain the packet data in a buffer temporarily and rebuild epoch data if needed, as a design option. Analogously, a receiving FIFO can store all or part of the epoch data to a buffer memory and delete the epoch data at some later point when an error is discovered, instead of deleting the epoch data directly from the FIFO. It is convenient for epochs to have a fixed size, but some embodiments can have variable epoch length. Although specific data structures, hardware, and functional hardware divisions have been used, these are merely exemplary. It is recognized that these concepts can be implemented in many other ways and on other hardware. Such minor modifications are encompassed within the invention, and are intended to fall within the scope of the claims.

Although the specification may refer to "a," "an," "one," "another," or "some" embodiment(s) in several locations, this does not necessarily mean that each such reference is to the same embodiment(s), or that the feature only applies to a single embodiment.

What is claimed is:

1. A packet switch comprising:
a switch fabric having multiple input and output data ports;
a plurality of ingress port pipes connected to provide input data to corresponding switch fabric input data ports;
a plurality of egress port pipes connected to receive output data from corresponding switch fabric output data ports;
a first ingress unit connected to provide input data to at least one of the ingress port pipes, the ingress unit transmitting epoch-formatted first packet data on the connected ingress port pipe during a first epoch and temporarily retaining the first packet data in memory beyond the end of the first epoch, the ingress unit comprising retransmission logic capable of initiating a retransmission of the retained first packet data during at least a second epoch; and
a first egress unit connected to receive output data from at least one of the egress port pipes, the egress unit receiving the epoch-formatted first packet data on the connected egress port pipe, the egress unit comprising a data integrity unit to check the epoch-formatted first packet data for errors, and
retransmission logic, comprising a retransmit monitor to track the error performance for epoch data received by the egress unit, capable of generating an error signal to another component of the packet switch when the epoch-formatted first packet data is received with an error and disabling error signal generation when the error performance does not meet an error criteria.

2. The packet switch of claim 1, further comprising a global error line, the egress unit retransmission logic comprising a driver to drive the error signal onto the global error line, the ingress unit retransmission logic comprising a receiver to receive the error signal on the global error line to initiate the retransmission.

3. The packet switch of claim 2, further comprising a second global error line, the egress unit retransmission logic further comprising a second driver to drive the error signal onto the second global error line, the ingress unit retransmission logic further comprising a second receiver to receive the error signal on the second global error line, and select logic to select one of the global error lines.

4. The packet switch of claim 2, the ingress unit further comprising a port pipe FIFO to provide the input data to at least one of the ingress port pipes, the port pipe FIFO having at least three epoch regions to hold epoch data for different epochs, wherein temporarily retaining the first packet data in memory beyond the end of the first epoch comprises the FIFO retaining the epoch-formatted first packet data in one of the epoch regions while waiting for a possible error signal on the global error line, and wherein a retransmission of the retained first packet data during at least a second epoch comprises the FIFO replaying the epoch-formatted first packet data during another epoch, from the epoch region in which the first packet data was retained.

5. The packet switch of claim 2, the ingress unit further comprising a random access memory managed as a set of virtual queues containing the first packet data at least prior to the first epoch, and a set of pending epoch pointers, wherein temporarily retaining the first packet data in memory beyond the end of the first epoch comprises assigning at least one of the pending epoch pointers to the first packet data in the random access memory, and not releasing the pending epoch pointer and associated memory while waiting for a possible error signal on the global error line, and wherein a retransmission of the retained first packet data during at least a second epoch comprises accessing the at least one pending epoch pointer assigned to the first packet data to read the first packet data out of the random access memory.

6. The packet switch of claim 2, further comprising a first timer to trigger the driver to drive the error signal a first set time after the end of the first epoch and during an epoch following the first epoch, and a second timer to trigger the receiver to sample the global error line after the first set time.

7. The packet switch of claim 2, further comprising additional ingress units connected to provide input data to respective ones of the ingress port pipes and additional egress units connected to receive output data from respective ones of the egress port pipes, wherein the additional ingress units and egress units also comprise receivers to receive the error signal on the global error line, all ingress units initiating a retransmission of the first epoch transmission when any egress unit generates an error signal on the global error line.

8. The packet switch of claim 7, the switch fabric further comprising:
a receiver to receive the error signal on the global error line; and
recycle logic to recycle a switch fabric configuration from the first epoch when any egress unit generates an error signal on the global error line.

9. The packet switch of claim 8, wherein the first epoch is epoch n, the error signal is generated at least during epoch n+1, all ingress units respond to the error signal by retransmitting their epoch n data during epoch n+2 and retransmitting their epoch n+1 data during epoch n+3, and the switch fabric recycle logic responds to the error signal by recycling the epoch n and epoch n+1 switch fabric configurations, respectively, during epochs n+2 and n+3.

10. The packet switch of claim 1, wherein the epoch-formatted first packet data comprises an epoch trailer containing an error-detection code, the data integrity unit using the error-detection code in checking the epoch-formatted first packet data for errors.

11. The packet switch of claim 10, the epoch trailer further comprising a record type field that indicates whether retransmission can be requested for the first packet data.

12. The packet switch of claim 11, the egress unit retransmission logic comprising override logic to disable error signal generation when the epoch-formatted first packet data is received with an error and with a record type field that indicates retransmission cannot be requested.

13. The packet switch of claim 10, the switch fabric comprising epoch trailer logic capable of modifying the record type.

14. The packet switch of claim 13, the switch fabric comprising a data integrity unit to check the epoch-formatted first packet data for errors, wherein the epoch trailer logic modifies the first packet data epoch trailer record type field to indicate an error when the epoch-formatted first packet data is received by the switch fabric with an error.

15. The packet switch of claim 14, wherein the data integrity unit is capable of generating an error-detection code for a received epoch and the epoch trailer logic is capable of appending an epoch trailer to the received epoch, the appended epoch trailer comprising the generated error-detection code and a record type field.

16. The packet switch of claim 14, the epoch trailer logic comprising logic to track the error performance of an ingress port pipe and modify the record type for epochs received on that port pipe to indicate that retransmission cannot be requested when the error performance of that port pipe does not meet an error criteria.

17. The packet switch of claim 10, wherein at least one of the port pipes comprises a receiver/sender intermediate the port pipe ends, the receiver/sender comprising epoch trailer logic capable of modifying the record type.

18. A packet switch comprising:
a switch fabric having multiple input and output data ports;
a plurality of ingress port pipes connected to provide input data to corresponding switch fabric input data ports;
a plurality of egress port pipes connected to receive output data from corresponding switch fabric output data ports;
two or more ingress units connected to provide input data to respective ones of the plurality of the ingress port pipes, the ingress unit transmitting epoch-formatted first packet data on the connected ingress port pipe during a first epoch and temporarily retaining the first packet data in memory beyond the end of the first epoch, the ingress unit comprising retransmission logic capable of initiating a retransmission of the retained first packet data during at least a second epoch; and
two or more egress units connected to receive output data from respective ones of the plurality of the egress port pipes, the egress units receiving the epoch-formatted first packet data on the respective ones of the plurality of egress port pipes, each of the egress units comprising a data integrity unit to check the epoch-formatted first packet data for errors, and each of the plurality of the egress units connects to a respective one of a plurality of error signal channels; and
retransmission logic capable of generating an error signal to another component of the packet switch over one of the plurality of the error signal channels when the epoch-formatted first packet data is received with an error.

19. The packet switch of claim 18, wherein the first and each additional ingress unit connect to the error signal channels, and wherein the retransmission logic on each ingress unit initiates a retransmission when an error signal is received on an error signal channel corresponding to an egress unit and epoch for which that ingress unit transmitted epoch-formatted packet data.

20. The packet switch of claim 18, further comprising a central scheduler connected to the error signal channels, the central scheduler rescheduling transmission of epoch data that was received in error and notifying the sender of that epoch data to schedule a retransmission.

21. A packet switch comprising:

a plurality of ingress units, each ingress unit transmitting corresponding epoch-formatted first packet data during a first epoch and temporarily retaining the first packet data in memory beyond the end of the first epoch, each ingress unit comprising retransmission logic capable of initiating a retransmission of the retained first packet data during at least a second epoch;

a switch fabric to receive the epoch-formatted first packet data from the ingress units and switch the epoch-formatted first packet data to corresponding ones of a plurality of egress units comprising a data integrity unit to check the epoch-formatted first packet data for errors, wherein the switch fabric is capable of modifying the correspondence between the ingress units and the egress units for different epochs; and retransmission logic capable of generating an error signal to another component of the packet switch when the epoch-formatted first packet data is received with an error.

22. The packet switch of claim 21, further comprising a meshed backplane connecting each ingress unit to one or more of the egress units without an intervening switch.

23. The packet switch of claim 22, wherein each ingress unit maintains a local epoch frame of reference for at least one connection to an egress unit.

* * * * *